US012750385B1

(12) United States Patent
Lin et al.

(10) Patent No.: US 12,750,385 B1
(45) Date of Patent: Sep. 29, 2026

(54) SYSTEMS AND METHODS FOR FALSE POSITIVE SUPPRESSION THROUGH DEPLOYMENT OF GENERATIVE ARTIFICIAL INTELLIGENCE

(71) Applicant: Splunk Inc., San Francisco, CA (US)

(72) Inventors: Xiao Lin, San Jose, CA (US); Javier Santoyo, Santa Monica, CA (US); Glory Emmanuel Avina, Brentwood, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/786,286

(22) Filed: Jul. 26, 2024

Related U.S. Application Data

(60) Provisional application No. 63/658,297, filed on Jun. 10, 2024.

(51) Int. Cl.
*H04L 29/06* (2006.01)
*G06F 40/30* (2020.01)
*H04L 9/40* (2022.01)

(52) U.S. Cl.
CPC .......... *H04L 63/1425* (2013.01); *G06F 40/30* (2020.01)

(58) Field of Classification Search
CPC ... H04L 63/1425; H04L 41/024; G06F 40/30; G06F 3/048; G06F 2209/545;
(Continued)

(56) References Cited

U.S. PATENT DOCUMENTS 7,937,344 B2 5/2011 Baum et al.
8,112,425 B2 2/2012 Baum et al.
(Continued)

FOREIGN PATENT DOCUMENTS

WO WO-2021076775 A1 * 4/2021 ........... G06F 16/901
WO WO-2025101175 A1 * 5/2025 ......... G06F 18/2413

OTHER PUBLICATIONS

Avinash, et al. (Year: 2023).*
(Continued)

*Primary Examiner* — Edward Zee
*Assistant Examiner* — Leynna Truvan
(74) *Attorney, Agent, or Firm* — Rutan & Tucker, LLP; Kyle M. St. James

(57) ABSTRACT

Disclosed herein are systems and methods directed to suppressing alerts of false positive anomalies. In particular, user feedback may be obtained on detected anomalies and utilized in prompt engineering of a large language model (LLM) as a one-shot or one of a few-shot examples. The prompt may be automatically engineered and constructed to instruct the LLM to determine whether a set of recently detected anomalies are false positives. Additionally, the prompt may be engineered to include numerous attributes of each of the recent set of anomalies including an anomaly name, an anomaly summary, a model or rule name that identified an event, behavior, or trend as the anomaly, feature names and values, an anomaly score, and/or an event timestamp. The response from the LLM may be utilized in generation of a graphical user interface that indicates a subset of the recent set of anomalies as false positives.

20 Claims, 18 Drawing Sheets

(58) Field of Classification Search
CPC ... H04N 21/83555; H04Q 2213/13525; H04B 17/26; H04W 36/008375; G05B 2219/13023; G05B 2219/32094; G05B 2219/35055; G05B 23/0224; G05B 2219/14055; G05B 2219/23335; G05B 2219/31288; G05B 2219/35291; G05B 13/0205; G05B 23/0243; G05B 23/0254; G05B 2219/35499; G05B 2219/34256; G05B 2219/32128; G01N 2035/0091; G01N 2035/00633; G10L 15/183; G01S 7/4866; G08B 13/19682; G01C 21/3617; G08G 1/096888; G08G 1/0129; G06Q 10/0838
See application file for complete search history.

(56) References Cited

U.S. PATENT DOCUMENTS

| | | | |
|---|---|---|---|
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2019/0098106 | A1 | 3/2019 | Mungel et al. |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.
Splunk Cloud 8.0.2004 User Manual, available online, retrieved May 20, 2020 from docs.splunk.com.
Splunk Enterprise 8.0.0 Overview, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
X. Lin et al. "Systems and Methods for False Positive Suppression Through Similarity Comparisons of Representation Vectors Generated Using Machine Learning," filed Jul. 26, 2024, U.S. Appl. No. 18/786,267 including its prosecution history.

* cited by examiner

800

802

804

806

| ANOMALY TYPE | PARTICIPANTS | SUMMARY | START DATE | SCORE | ANOMALY WATCHLIST |
|---|---|---|---|---|---|
| Suspicious Network Connection | Chris Moreno<br>205.251.229.201<br>acme-93172303<br>tcp | DNS Protocol Anomaly | Mar 31, 2024<br>7:46 AM | 3 | User Feedback |
| Suspicious Network Connection | Rithi Ravikumar<br>acme-21064119<br>acme-91543286<br>ssh | SSH Reverse Shell | Apr 4, 2024<br>7:24 AM | 5 | False Positive |
| Suspicious Network Connection | Chip Lope<br>acme-21064119<br>acme-56058898<br>ssh | SSH Reverse Shell | Apr 4, 2024<br>7:24 AM | 5 | False Positive |
| Suspicious Network Connection | Beau Struthers<br>54.190.62.152<br>acme-48140652<br>dns | DNS Data Transfer | Apr 22, 2024<br>3:28 AM | 7 | False Positive |
| Suspicious Network Connection | Jelene Molaroni<br>67.168.140.28<br>acme-66381164<br>ntp | NTP Protocol Anomaly | Apr 23, 2024<br>10:03 AM | 8 | False Positive |
| Suspicious Network Connection | Jillie Slade<br>67.168.140.28<br>acme-72415241<br>ntp | NTP Protocol Anomaly | Apr 23, 2024<br>10:48 AM | 9 | False Positive |
| Suspicious Network Connection | Network Test<br>52.198.54.55<br>acme-97773681<br>ssh | SSH Reverse Shell | Apr 23, 2024<br>12:39 PM | 9 | |
| Suspicious Network Connection | Anu Ashok<br>66.249.227.162<br>acme-48145652<br>ntp | NTP Data Transfer | Apr 23, 2024<br>2:19 PM | 5 | False Positive |

808 Auto Detect

808 Auto Detect

FIG. 8

SYSTEMS AND METHODS FOR FALSE POSITIVE SUPPRESSION THROUGH DEPLOYMENT OF GENERATIVE ARTIFICIAL INTELLIGENCE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Anomaly detection is a concept within the field of data analytics that includes identifying unusual activities, behaviors, or patterns through analysis of data in view of a baseline or norm. Anomaly detection methodologies may be implemented across a wide variety of fields and for various purposes. In many instances, anomaly detection is deployed within the field of cybersecurity in order to detect anomalies such as data breaches or cyberattacks. However, anomaly detection methodologies may be employed to detect anomalies or trends in numerous other use cases. The effectiveness of these methodologies is challenged by the diverse nature of user and entity behaviors across various organizations. In particular, predetermined thresholds often fail to account for unique behavioral baselines, making accurate anomaly detection difficult resulting in false positives, which may be understood as an incorrect identification of a normal or benign activity or behavior as an anomaly.

BRIEF DESCRIPTION OF THE DRAWINGS

Illustrative examples are described in detail below with reference to the following figures:

FIG. 8 illustrates a third GUI of an anomalies table providing a listing of detected anomalies, details thereof and automated false positive identified indicator according to an implementation of the disclosure;

DETAILED DESCRIPTION

Figure 1:
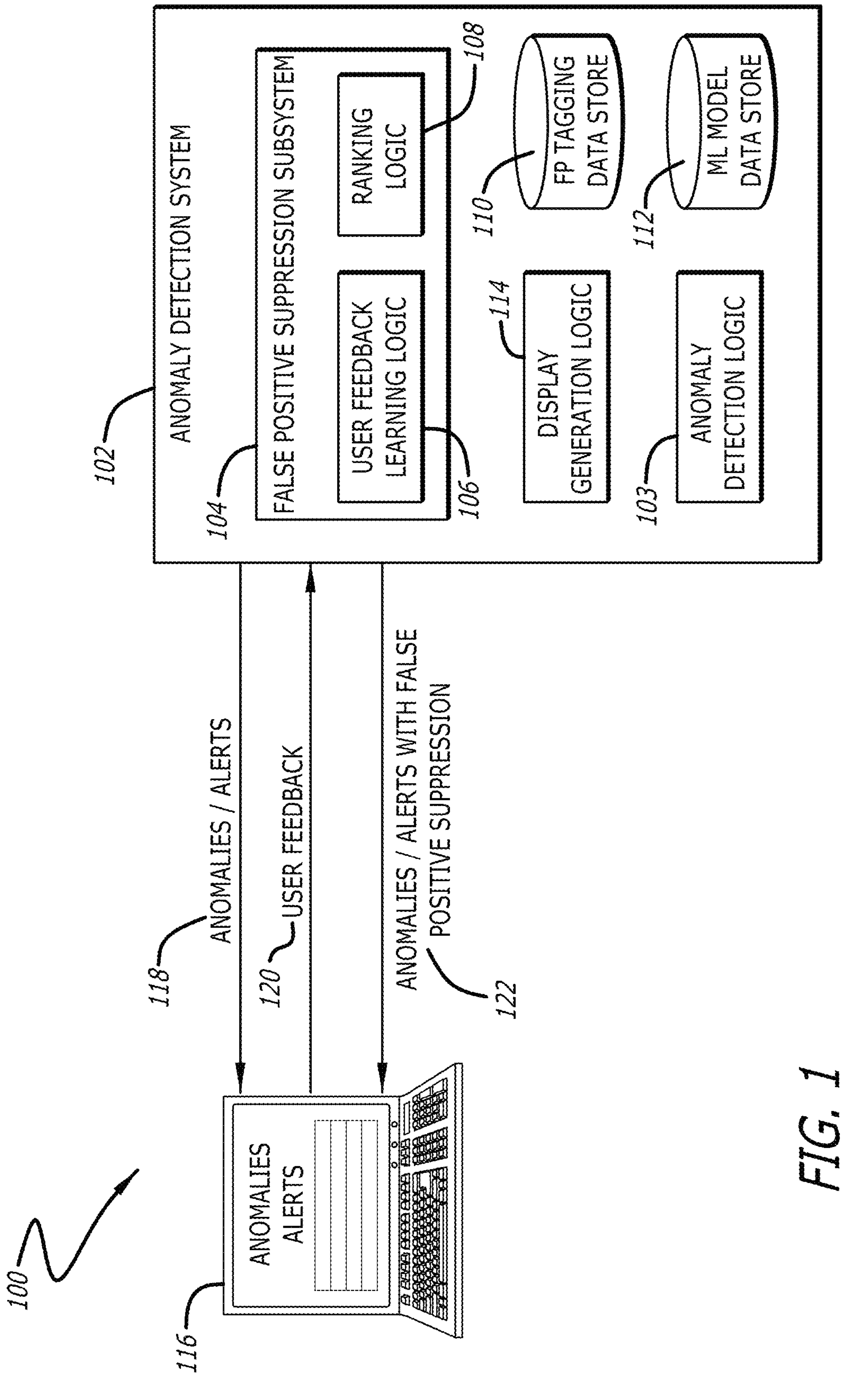
FIG. 1 is a block diagram illustrating a networked environment configured with network components and logic including an anomaly detection system and a false positive suppression subsystem according to an implementation of the disclosure.

Anomaly and threat detection tools have become an integral part of maintaining the security of an enterprise network. These tools ("anomaly detection systems") enable information technology (IT) staff or, more specifically, security operations center (SOC) analysts, with the ability to detect and track anomalies, investigate incidents connected to these anomalies, and implement or initiate a response thereto. Many anomaly detection systems perform scanning operations or analyses on data generated by components connected to the enterprise network, on data sent from or received by components connected to the enterprise network, and/or on metadata associated therewith. These scanning operations or analyses typically result in the generation of alerts that indicate the presence of an anomaly or cyberthreat.

While the uncovering of anomalies and cyberthreats is undoubtedly a positive, SOC analysts are often inundated with alerts generated by anomaly detection systems, which leads to challenges in detecting and addressing actual issues with the enterprise network. Specifically, as the amount of data that is generated, scanned, and analyzed grows, the number of alerts generated grows such that the sheer number of alerts often becomes overwhelming for a SOC analyst and prevents the analyst from reviewing and addressing alerts in a timely manner. More so, alerts are often tied to time-sensitive issues such that by the time an analyst is able to address an issue, unnecessary harm may have occurred. For example, a data extraction issue may be identified by an anomaly detection system alerting an analyst to potential command and control (C2) server communications with a network device connected to the enterprise network resulting in malicious extraction of confidential information. However, if the alert is buried among hundreds or thousands of alerts, the analyst may not address the issue in a timely manner resulting in the malicious extraction of confidential information that would have otherwise been curtailed or contained had the corresponding alert not be buried.

One situation that compounds the issue of inundating an analyst with alerts, and which often leads to alert fatigue, is the presence of false positives. While anomaly detection systems have become more accurate in recent years, the ability to avoid false positives is challenged by the diverse nature of user and entity behaviors, which make use of predetermined thresholds to identify anomalies often fail to account for unique behavioral baselines. Temporal variations within the same environment further complicate monitoring and detection efforts, as user or entity behaviors often differ greatly between regular workdays and weekends, work hours and off-hours, during holiday seasons, etc. Even more so, the recurrence of false alerts previously flagged by analysts exacerbates the issue. Specifically, most anomaly detection systems base their analyses and conclusions solely on input data without incorporating analysts' feedback on previously reported anomalies.

Implementations disclosed herein include obtaining user feedback on detected anomalies, generating representation vectors therefrom, obtaining subsequently detected anomalies, generating representation vectors therefrom, determining a similarity measure between representation vectors of previously detected anomalies and the subsequently detected anomalies, and ranking representation vectors of the subsequently detected anomalies to automatically suppress false positive alerts. Additional implementations disclosed herein integrate generative artificial intelligence (GenAI) into the threat detection workflow to automatically suppress false alerts.

The implementations of the following disclosure provided several practical applications and advances to multiple technological fields, especially observability, which may include the monitoring of states of a system and enabling the diagnosis and resolution of system problems (or identifying and preventing such beforehand). Some example practical applications include the suppression of false positive alerts, specifically the suppression of alerts indicating an event, behavior, or trend is anomalous, when the same or very similar events, behaviors, or trends were previously noted as being false positives through user feedback. As noted herein, in today's highly complex computing environment, numerous computing systems are monitored through the collection of vast amounts of data, such as measurements every few seconds or minutes. Thus, alerts of anomalous events, behaviors, or trends often compile and overwhelm data analysts tasked with managing the computing systems by monitoring the alerts. As will become apparent below, the identification of alerts that are the same as or similar to alerts previously marked as false positives is performed through operations that include the deployment of machine learning models and/or connectors to large language models.

I. System Architecture—First Implementation

Referring now to FIG. 1, a block diagram illustrating a networked environment configured with network components and logic including an anomaly detection system and a false positive suppression subsystem is shown according to an implementation of the disclosure. The networked environment 100 includes an anomaly detection system 102 that may be comprised of logic modules configured to perform specific and particularized operations upon execution by one or more processors. The logic may include an anomaly detection logic 103, a false positive suppression subsystem 104 that includes a user feedback learning logic 106 and a ranking logic 108, and a display generation logic 114. The anomaly detection system 102 may also include a false positive tagging data store 110 and a machine learning model data store 112. The false positive tagging data store 110 may be configured to store anomalies that have been marked as being false positives by either user feedback or automatically by the false positive suppression subsystem 104. The machine learning model data store 112 may be configured to store trained machine learning models and training data.

The anomaly detection system 102 may be configured to communicate with a network device 116 that is configured to receive anomalies and/or alerts 118 from the anomaly detection system 102, render or display a graphical user interface (GUI) illustrating the anomalies and/or alerts 118, receive user feedback 120 and provide the same to the anomaly detection system 102, which in turn may continue the iterative process by providing additional anomalies and/or alerts 122 with false positive tag information. As will be described in further detail below, the user feedback 120 may include an indication that one or more of the anomalies 118 are false positives. The false positive suppression subsystem 104 processes the false positive feedback to automatically label subsequently detected anomalies that satisfy a similarity determination procedure, e.g., satisfy a similarity threshold relative to the anomaly indicated as being a false positive or form a subset of subsequently detected anomalies that are most similar to the anomaly indicated as being a false positive.

In particular, the user feedback learning logic 106 may train and deploy a machine learning model that is configured to generate representation vectors of anomalies provided as input. Specifically, in one implementation, when a batch of anomalies are detected, which may be a result of processing by the anomaly detection logic 103, the batch of anomalies (current set of anomalies) are provided as input to the machine learning model along with a set of historical anomalies detected within a prior time window of a predefined length and which have been marked as false positives (historical anomalies marked as false positives). The machine learning model generates representation vectors for each anomaly and similarity measures are determined between the representation vectors of the current set of anomalies and the representation vectors of the historical anomalies marked as false positives.

The ranking logic 108 may then determine which, if any, of the current set of anomalies should be automatically labeled as false positives due to the level of similarity with one or more of the historical anomalies marked as false positives. In some examples, the ranking logic 108 may determine a subset of the detected anomalies having representation vectors that are within a top N anomalies (where $N \geq 1$) with respect to the similarity measure, e.g., rank the anomalies in order of similarity to a stored anomalies that was previously marked as a false positive and select the N anomalies having the highest similarity measures. In other examples, N may represent a percentage, e.g., the top 10%. In yet other examples, the ranking logic 108 may determine a subset of the detected anomalies having representation vectors that have a similarity measure that satisfies a threshold comparison, e.g., is greater than or equal to a similarity threshold.

Figure 2:
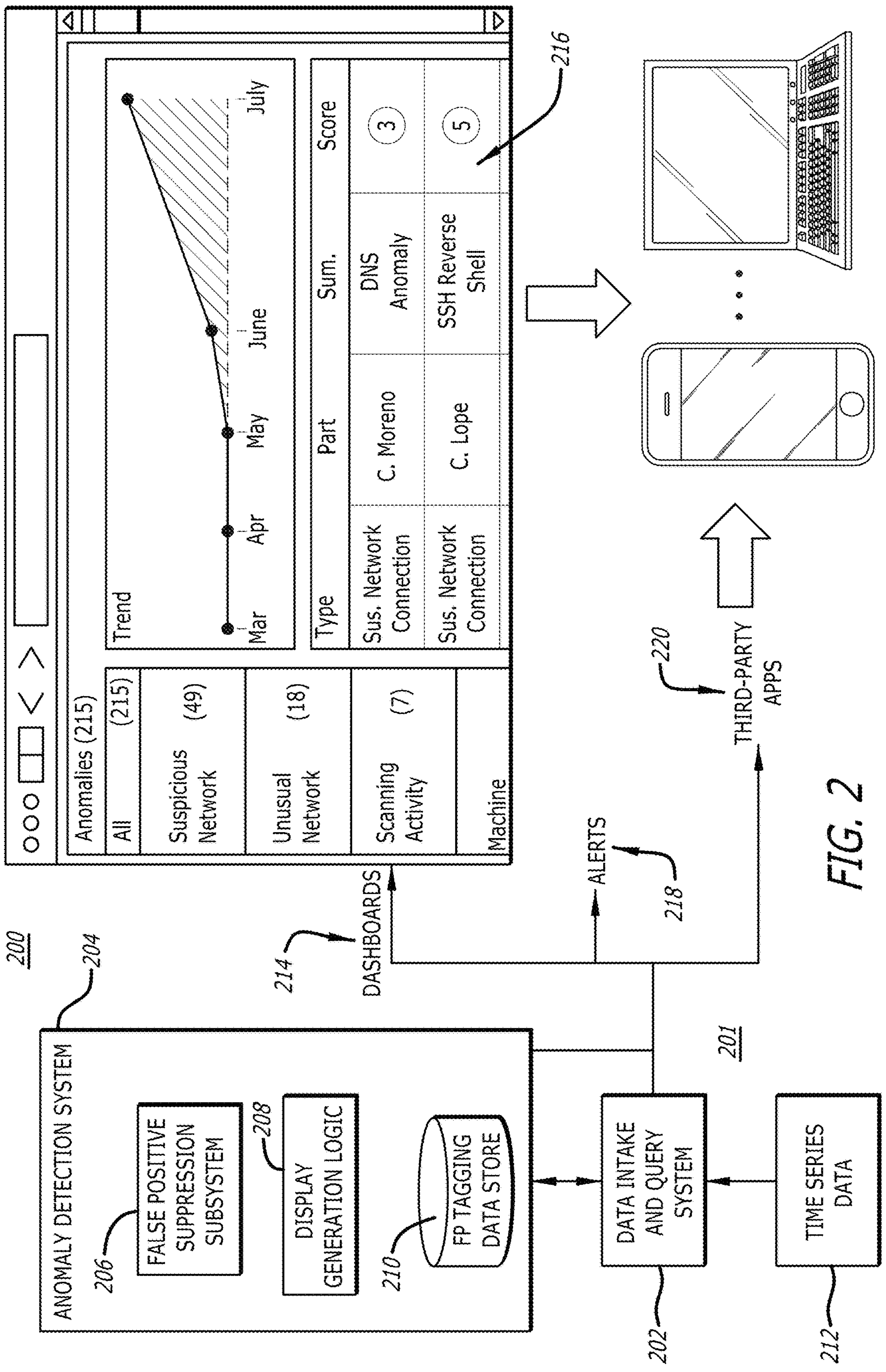
FIG. 2 is a block diagram illustrating a deployment configuration of a networked environment including an anomaly detection system and a false positive suppression subsystem and other network components according to an implementation of the disclosure.

FIG. 2 is a block diagram illustrating a deployment configuration of a networked environment including an anomaly detection system and a false positive suppression subsystem and other network components is shown according to an implementation of the disclosure. The networked environment 200 includes several components including hardware and software that are communicatively coupled through a network, namely the internet, which may be represented by reference number 201. As illustrated, the networked environment 200 includes a data intake and query system 202 communicatively coupled to an anomaly detection system 204, which may be stored and process locally, such as on on-premise storage and resources, or may be stored and process remote, such as on cloud-computing resources.

The anomaly detection system 204 is shown to include logic such as a false positive suppression subsystem 206 and a display generation logic 208. The anomaly detection system 204 may also include a false positive (FP) tagging data store 210. These components may correspond to similarly named components illustrated in and discussed with respect to FIG. 1.

FIG. 2 illustrates that the data intake and query system 202 may be configured to receive data such as time-series data 212, which may be indexed and stored as discussed below, and obtained by the anomaly detection system 204, which performs one or more anomaly detection analyses thereon resulting in a plurality of alerts of anomalous events. As discussed below, the data intake and query system 202 may include an indexing system that processes received data, which may include parsing the data to identify individual events, where an event is a discrete portion of machine data that can be associated with a timestamp. Processing of the data can further include generating an index of the events, where the index is a data storage structure in which the events are stored. Prior to transmission or display of the alerts to a user via a dashboard 214, alerts (e.g., notifications such as email, text messages, etc.) 218, and/or to third-party apps 220, the alerts are analyzed by the false positive suppression subsystem 206.

The analysis performed by the anomaly detection system 204 may result in certain actions performed automatically including generation and display of a dashboard 214 that includes a listing of alerts 216, generation and display or transmission of alerts 218, and/or generation of instructions for or actions performed automatically using a third-party application 220. The generation of instructions for or actions performed automatically using a third-party application 220 may include, e.g., instructing an email client such as, for example, OUTLOOK® provided by Microsoft Corporation, or other email or messaging clients to perform specific, automated operations. In such examples, the anomaly detection system 204 may initiate the transmission of information to an end user and/or instruct a browser application processing on a network device $\mathbf{222}_1, \ldots \mathbf{222}_i$, email or messaging client, or other application to take action such as moving emails from an inbox to a spam folder, deleting an email or file, flagging an email or file, etc., and/or blocking a URL at a firewall, web gateway, or other proxy server.

Figure 3:
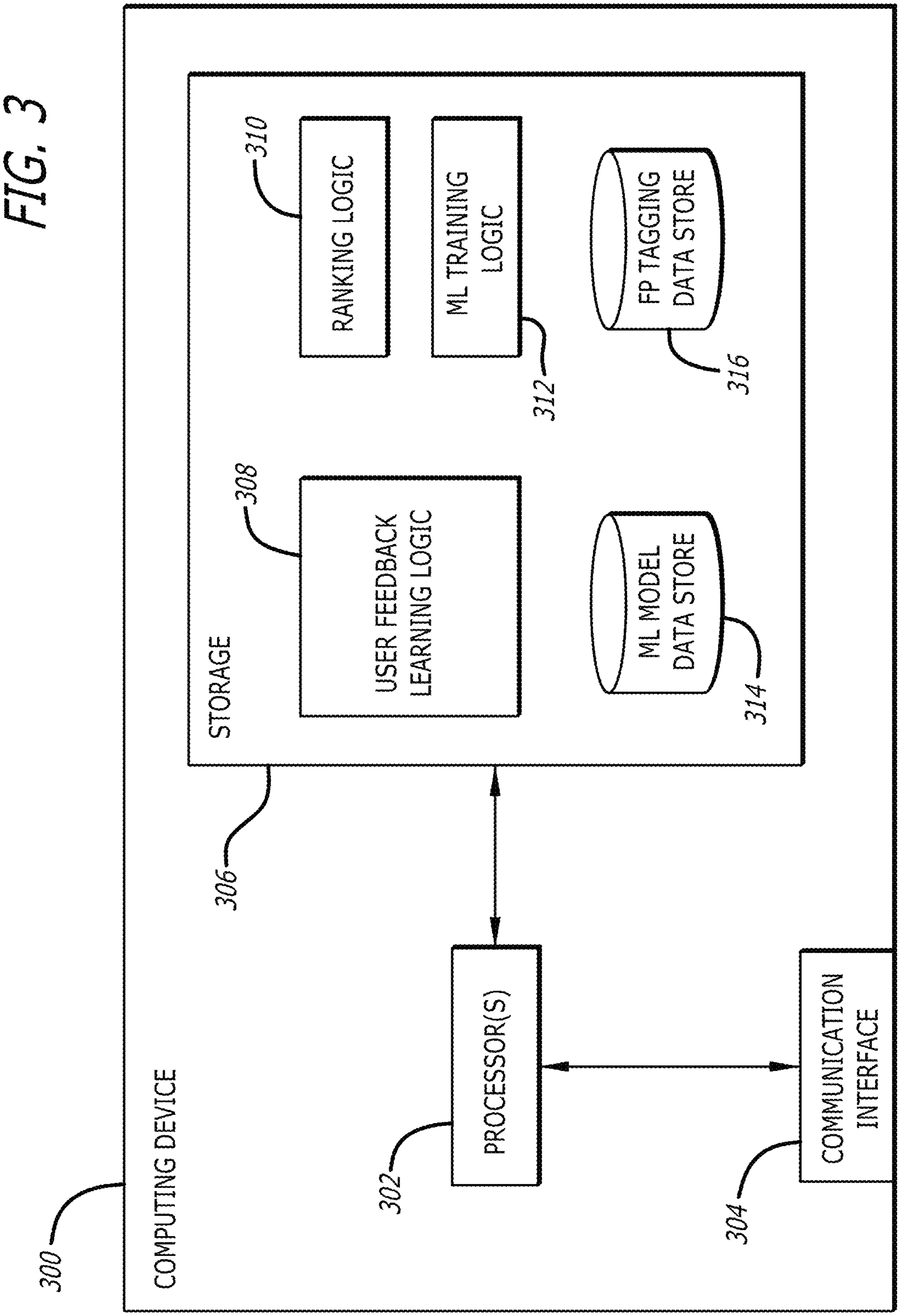
FIG. 3 is a logic diagram illustrating logic components of a false positive suppression subsystem according to an implementation of the disclosure.

FIG. 3 is a logic diagram illustrating logic components of a false positive suppression subsystem is shown according to an implementation of the disclosure. In the example shown in FIG. 3, a computing device 300 includes one or more processors 302 that is communicatively coupled to a communication interface 304 and storage 306, which may be non-transitory computer readable medium. The storage 306 may have stored thereon logic, e.g., in the form of computer-executable instructions, that, when executed by the processor 302, cause the processor 302 to perform the methods described herein.

As used herein, one implementation of a computing device may be server device that has a memory for storing program code instructions and a hardware processor for executing the instructions. The server device can further include other physical components, such as a network interface or components for input and output. The storage 306 may include components that may form a portion of an anomaly detection system, such as the anomaly detection system 102 of FIG. 1. In particular, the logic components illustrated in FIG. 3 include a user feedback learning logic 308, a ranking logic 310, and a machine learning (ML) training logic 312. Additionally, the storage 306 may be comprised of a ML model data store 314 and a FP tagging data store 316.

In some examples, the data stores 314, 316 may be stored elsewhere and be accessible to the logic models stored in the storage 306. Examples of storage 306 include non-transitory computer-readable mediums, such as a magnetic or optical storage disk or a flash or solid-state memory, from which the program code can be loaded into the memory of the computing device 300 for execution. The term "non-transitory" refers to retention of the program code by the computer-readable medium while not under power, while volatile or "transitory" memory or media requires power in order to retain data.

II. Architectural Flow—First Implementation

Figure 4:
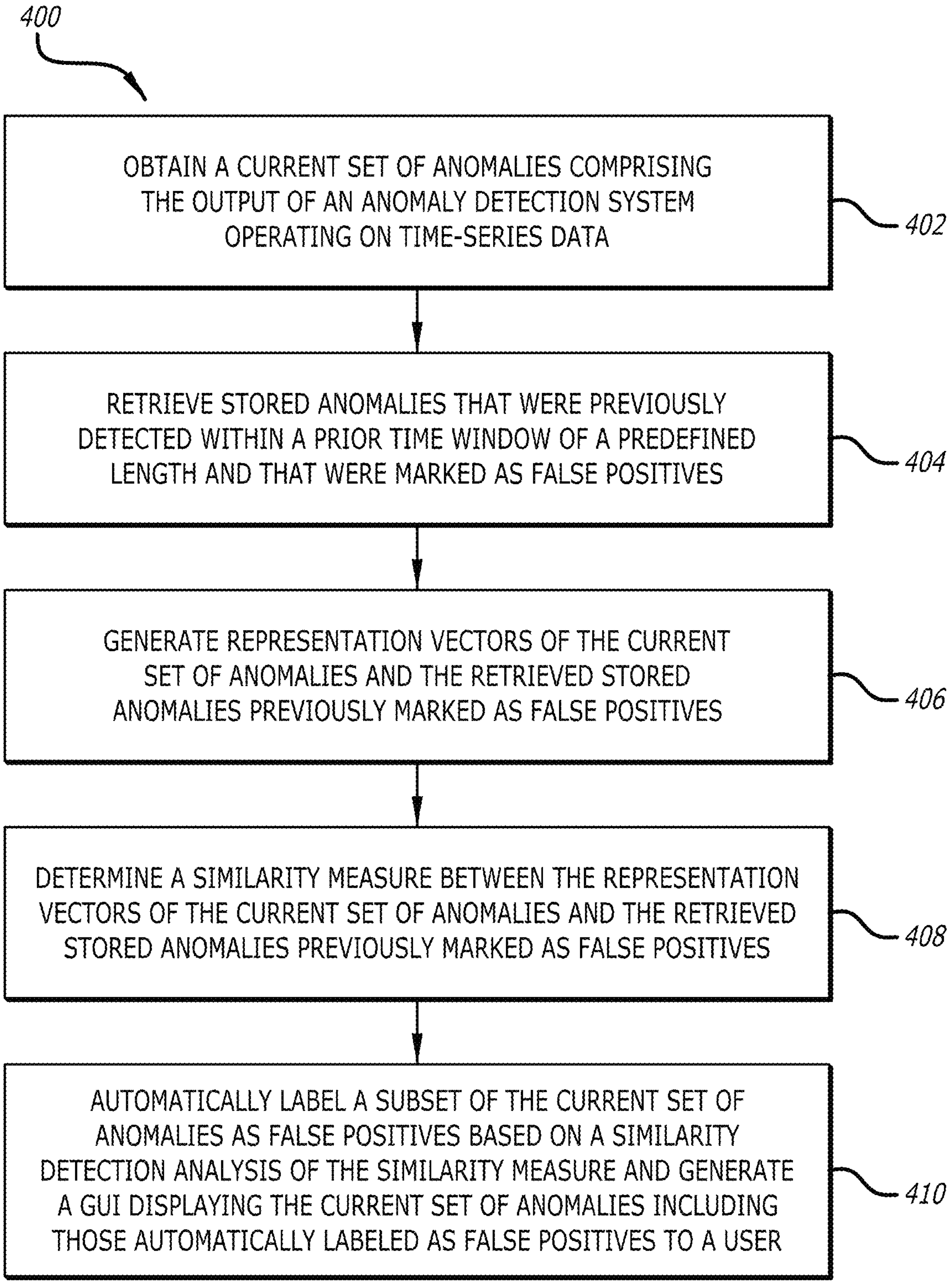
FIG. 4 is a flowchart illustrating example operations for performing a false positive suppression procedure according to an implementation of the disclosure.

Referring to FIG. 4, a flowchart illustrating example operations for performing a false positive suppression procedure is shown according to an implementation of the disclosure. Each block illustrated in FIG. 4 represents an operation in the process 400 performed by, for example, the false suppression subsystem 102 as shown in FIG. 1. It should be understood that not every operation illustrated in FIG. 4 is required. In fact, certain operations may be optional to complete aspects of the process 400. The discussion of the operations of process 400 may be done so with reference to any of the previously described figures.

The process 400 begins with obtaining a current set of anomalies comprising the output of an anomaly detection system operating on time-series data (block 402). In some examples, an anomaly detection system may perform anomaly detection analyses on received data, e.g., time-series data, which may include various statistical analyses that include comparing data points to static or dynamic thresholds and/or outlier detection analyses, machine learning analyses that may identify anomalous patterns through machine learning clustering models, predicative analyses that predict future values that may then be compared to thresholds and/or clusters to identify anticipated anomalies, behavioral analytics that determine an entity's baseline (normal/expected) behavior patterns and compare the received data to the baseline behavior patterns to identify behavioral anomalies, etc. In some instances, a detected anomaly may be an individual data point within a time-series data set (e.g., an event) or a series of data points. The anomaly, being one or more events, includes values within a plurality of data fields.

The process 400 continues with retrieving stored anomalies that were previously detected within a prior time window of a predefined length and that were marked as false positives (block 404). In some instances, the previously detected anomalies marked as false positives may have been marked as such in response to receipt of user input, such as by a SOC analyst. As will be discussed in further detail with respect to FIGS. 6A-6C, the prior time window may vary based on the implementation. For example, three approaches are discussed below including utilization of all historical data, utilization of a fixed time window and disregarding all previous data for each time window where there is no overlap between adjacent time windows, and a sliding time window where there is overlap between adjacent time windows.

Representation vectors of the current set of anomalies and the representation vectors of the retrieved stored anomalies that were previously marked as false positives are then generated (block 406). The disclosure provides multiple implementations for generating the representation as discussed in further detail below including deployment of a word embedding model, deployment of an encoder of a transformer-based encoder-decoder architecture, and generation of a transformation matrix.

Similarity measures are then determined between each of the representation vectors of the current set of anomalies and each of the representation vectors of the retrieved stored anomalies that were previously marked as false positives (block 408). For example, the similarity measure may be, for example, the cosine similarity, the Euclidean distance, the Manhattan distance (L1 norm), the Minkowski distance, the Jaccard similarity, the Pearson correlation, the cosine distance, etc. In some examples, a plurality of methodologies may be utilized where a final conclusion of similarity may be based on a weighted sum of the results of multiple methodologies.

Based on the similarity measures, a subset of the representation vectors of the current set of anomalies are automatically labeled as false positives and a GUI is generated that displays the current set of detected anomalies including those automatically labeled as false positives to a user (block 410). In some examples, the detected anomalies having representation vectors that are within a top N anomalies (where $N \geq 1$) or a top similarity percentage to a representation vector of a retrieved stored anomalies that were previously marked as false positives form the subset automatically labeled as false positives. In other examples, the detected anomalies having representation vectors that have a similarity measure satisfying a threshold comparison (e.g., greater than or equal to, greater than, etc.) form the subset automatically labeled as false positives.

In some implementations, the anomaly detection system 102 of FIG. 1 may be configured to initiate a procedure at a set time each day, e.g., following the execution times of cron jobs of other offline machine learning models, that includes retrieval of anomalies detected that day and processes all the anomalies generated daily by other machine learning models in any of the implementations discussed here. The anomalies produced by streaming models and rule-based detections up to this point may also be processed daily. For example, upon retrieving all anomalies from the past day (current set of anomalies) may be processed by a machine learning model along with a set of historical anomalies previously marked as false positives, where the model generates a representation vector of the anomalies. A similarity measure between the representation vectors of the current set of anomalies and the representation vectors of the historical anomalies previously marked as false positives in order to determine whether the similarity measure any of the current anomalies satisfies a threshold comparison and/or is within a top number or percentage of the current anomalies, which indicates such should be automatically labeled as false positives prior to displaying such to a user.

In some implementations, the sensitivity of automatic false positive suppression can be adjusted by adjusting a similarity threshold, which may be predefined, e.g., a default value of the threshold may be 0.99. The threshold value may be increased for stricter detection of false positives or decreased for less strict suppression.

A. Word Embedding Implementation

In some implementations, the operation of generating representation vectors of the current set of anomalies and the retrieved stored anomalies previously marked as false positives as discussed in FIG. 4 with respect to at least block 406, the generating may be performed through deployment of a word embedding model. For example, a word embedding model may be pretrained from a large text corpus. In some instances, the pretrained word embedding model may be augmented with a corpus of anomalies using a self-supervised learning process where the training process includes generation of pseudo-labels form the corpus of anomalies. Examples of word embedding models or techniques for training word embedding models may include, but are not limited or restricted to, Word2Vec, Continuous Bag of Words (CBOW), Skip-gram, GloVe, FastText, etc.

In some instances, the word embedding model may have a model architecture that includes an input layer, an embedding layer, a hidden layer, and an output layer. The word embedding model may be trained through self-supervised training such that the trained model may be configured such that an input layer is configured to receive anomalies and generate latent representation vectors (representation vector or otherwise referred to as an embedding vector) thereof. During deployment of the word embedding model, the input layer receives a plurality of anomalies comprised of current set of anomalies comprising the output of an anomaly detection system operating on time-series data as referenced in block 402 of FIG. 4 and stored anomalies that were previously detected within a prior time window of a predefined length and that were marked as false positives as referenced in block 404 of FIG. 4. The word embedding model processes the plurality of anomalies resulting in generation of a plurality of corresponding representation vectors. For example, the word embedding model may process a first anomaly by receiving the first anomaly at the input layer and generate an embedding vector representative of the first anomaly. The process of generating the embedding vector is repeated for each anomaly.

Subsequently, as illustrated in FIG. 4 and discussed at least with respect to blocks 408-410, similarity measures are determined between each of the embedding vectors (representation vectors) for the current set of anomalies and the embedding vectors (representation vectors) for the stored anomalies that were previously detected within a prior time window of a predefined length and that were marked as false positives. Based on the similarity measures, a subset of the current set of detected anomalies are automatically labeled as false positives.

B. Encoder-Based Implementation

Figure 5:
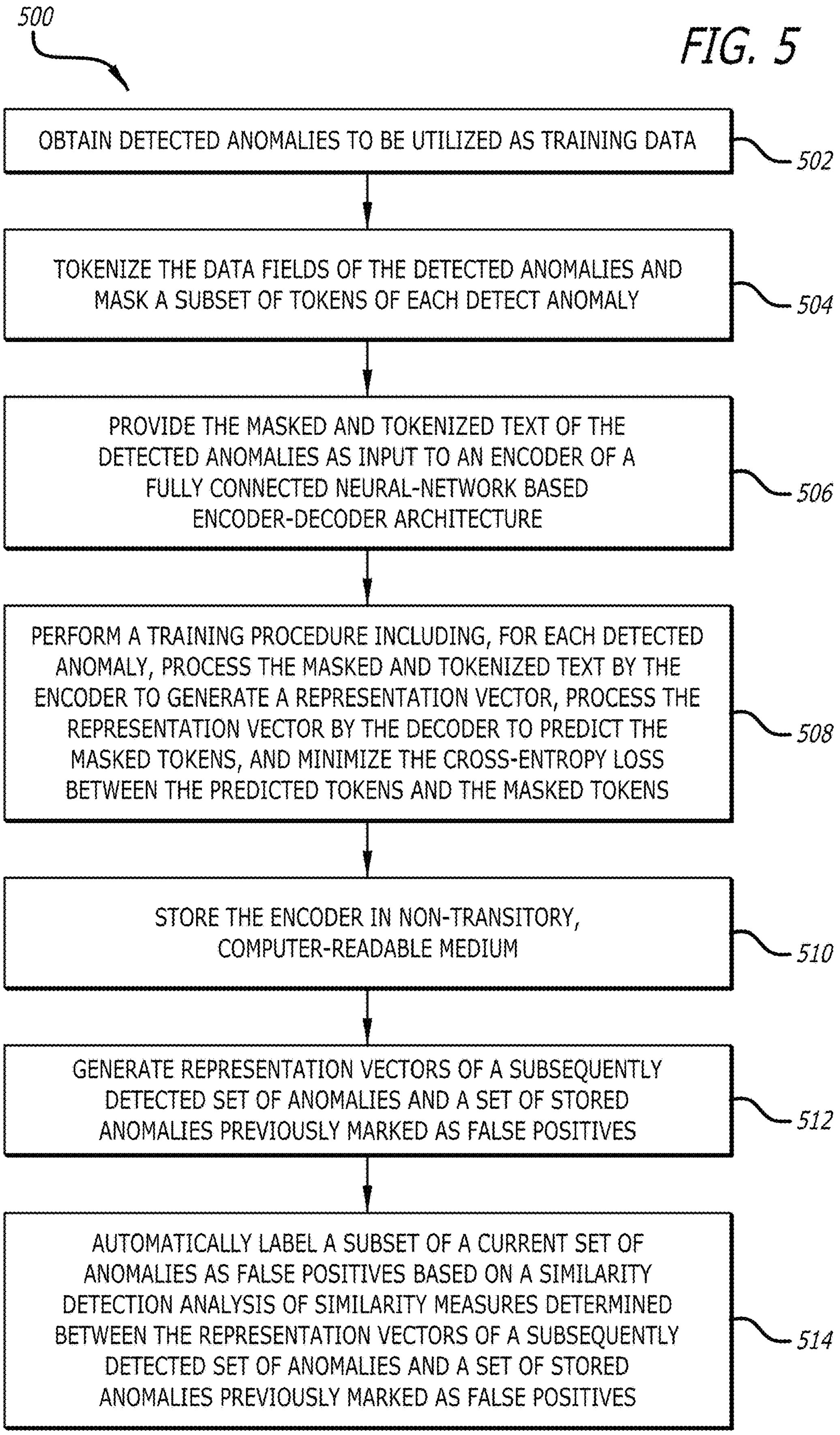
FIG. 5 is a flowchart illustrating example operations for performing a training process and deployment of a transformer-based encoder-decoder architecture according to an implementation of the disclosure.

Referring now to FIG. 5, a flowchart illustrating example operations for performing a training process and deployment of a transformer-based encoder-decoder architecture is shown according to an implementation of the disclosure. Each block illustrated in FIG. 5 represents an operation in the process 500 performed by, for example, the false suppression subsystem 102 as shown in FIG. 1. It should be understood that not every operation illustrated in FIG. 5 is required. In fact, certain operations may be optional to complete aspects of the process 500. The discussion of the operations of process 500 may be done so with reference to any of the previously described figures.

The process 500 begins with obtaining detected anomalies to be utilized as training data (block 502). In addition to the detected anomalies marked as false positives, the process 500 may also include obtaining detected anomalies that were not marked as false positives or those explicitly marked as anomalies, all of which may be used as training data as discussed further below with respect to FIGS. 6A-6C. The examples discussed above with respect to FIG. 4 are applicable here, where an anomaly detection system may perform anomaly detection analyses on received data, e.g., time-series data, which may include various statistical, machine learning analyses, predicative analyses, behavioral analytics, etc. As with the process 400, a detected anomaly may be an individual data point within a time-series data set (e.g., an event) or a series of data points. The anomaly, being one or more events, includes values within a plurality of data fields.

The process 500 continues with tokenizing the data fields of the detected anomalies and masking a subset of tokens of each detected anomaly (block 504). For example, the masked tokens may be a particular term or unique token. The masked and tokenized text of the detected anomalies are then provided as input to a fully connected neural network based encoder-decoder architecture ("encoder-decoder architecture") thereby serving as training data (block 506).

A training procedure for the encoder-decoder architecture is then performed including, for each detected anomaly, process the masked and tokenized text, e.g., by the encoder, to generate a representation vector (otherwise referred to as a hidden representation or latent vector), process the representation vector, e.g., by the decoder, to predict the masked tokens, and minimize the cross-entropy loss between the predicted tokens and the masked tokens (block 508). In some instances, the encoder is comprised of a plurality of fully connected layers that progressively reduce the size of the input into the representation vector. In some instances, the decoder may be comprised of a plurality of fully connected layers that progressively increase the dimensionality of the representation to match an output size.

Following the training, which may involve multiple epochs (passes) through the detected anomalies (training data), the encoder-decoder architecture is stored in non-transitory, computer-readable medium (block 510). In some implementations, the decoder is stored with the encoder. However, in alternative implementations, the decoder is discarded or otherwise not stored. Some implementations of the disclosure do not utilize the decoder once the training of the encoder-decoder architecture is completed.

Additionally, following detection of additional anomalies, the subsequently detected anomalies may be tokenized and provided to the encoder along with a set of previously detected anomalies that have been stored and that were marked as false positives. The encoder generates representation vectors for each of the subsequently detected anomalies and the set of previously detected anomalies previously marked as false positives (block 512).

Following generation of the representation vectors, a subset of the subsequently detected anomalies may be automatically labeled as false positives based on a similarity detection analysis of similarity measures determined between the representation vectors of the subsequently detected anomalies and a set of anomalies previously marked as false positives (block 514).

It should be understood that training an encoder-decoder architecture via self-learning as disclosed herein to convert detected anomalies into representation vectors has the advantage of not requiring labeled data. Additionally, this vectorization process transforms complex data points into a structured format for efficient analysis. The trained model (encoder or word embedding model discussed above) resulting from the training discussed above is configured to capture the relationships and similarities between different alerts by representing anomalies as vectors. This numerical representation allows for comparing new alerts against the existing database of tagged false positives, ranking new anomalies based on their similarity to previously identified false alerts, which in turn enables automatic suppression of false positives significantly reducing repeated false positives. This proactive approach helps SOC analysts focus on genuine threats rather than recurring false alarms, avoiding false alert fatigue.

C. Transformation Matrix Implementation

In one implementation of the process 500, given a collection of anomaly items $A[e_i][c_j][T_k]$, where $e_i$ refers to entity (user or device) index i, $c_j$ refers to anomaly category index j, $t_k$ refers to a time moment within the range $t_k \in [T_c - \Delta T, T_c]$. Here, $T_c$ is the current time, and $\Delta T$ is the time span over which event history is stored. Each element of A may contain at least the following attributes, as listed in Table 1 below:

TABLE 1

Attributes of an Anomaly Item

| Attribute | Type | Description |
|---|---|---|
| P | boolean | false positive flag |
| N | string | anomaly name |
| D | string | anomaly summary |
| M | string | model/rule name |
| F | list of string | feature names |
| V | list of numeric | feature values |
| S | numeric | anomaly score |
| T | string | event timestamp |

The goal is to determine whether P=true for $A[e_i][c_j][T_c]$, if a subset of $A[e_i'][c_j'][t_k']$ has been flagged as false positives, where $t_k' \in [T_c - 1 - \Delta t, T_c - 1]$, and $\Delta t < \Delta T$ is the length of time for which analyst flags will be kept. The vector representation may be trained using any of the approaches illustrated in and described with respect to FIGS. 6A-6C.

In such implementations, the vectors generated from the previous window are, $\vec{V} = \{vo_1, vo_2, \ldots, v_{oP}, v_{o(P+1)}, \ldots, v_{oN}\}$ and the new vectors for the added anomalies are $\vec{V} = \{v_{n1}, v_{n2}, \ldots, v_{nP}, v_{n(P+1)}, \ldots, v_{nM}\}$. Subsequently, the processes involves determining the transform matrix [T]:

$$v_{oi} = [T] \cdot v_{ni} \text{ for } i \in [1, P] \qquad \text{Equation 1}$$

P represents the shared anomalies for the two vector representations. The complete vectors are generated that are defined as:

$$\vec{V_t} = \{\vec{v_{t1}}, \vec{v_{t2}}, \ldots, \vec{v_{tP}}, \vec{v_{t(P+1)}}, \ldots, \vec{v_{tN}}, \vec{v_{t(N+1)}}, \vec{v_{t(N+2)}}, \ldots, \vec{v_{(N+M+P)}}\} \text{ where,} \quad \text{Equation 2}$$

$$\vec{v_{ti}} = ((r/(r+1))\vec{v_{oi}} + (1/(r+1)[T]\cdot\vec{v_{ni}}) \quad \text{for } i \in [1, P]$$

$$\vec{v_{ti}} = [T]\cdot\vec{v_{n(i-N+P)}} \quad \text{for } i \in [N+1, N+M+P]$$

The effectiveness of the transformation is demonstrated in Table 2 below, showing a small standard deviation, which demonstrates a preservation of orthogonality of vectors after transformation.

TABLE 2

Vector Transformation Validation

| | Min. | Max. | Mean | Stdev |
|---|---|---|---|---|
| Before | −0.13 | 0.54 | 0.09 | 0.12 |
| After | 0.51 | 1.00 | 0.99 | 0.01 |

$A[e_i][c_j][T_c]$ is then ranked against A[ei'][cj'][tk'] based on the similarity of their vector representations. When computing the vectors in the current time span, new anomalies are used as training data, and vectors for all the anomalies are obtained through matrix transformation as described with respect to Equation 2. In this way, incremental model training is realized thereby reducing (saving) computation resources. The vectors resulting from the transformation matrix implementation may then be used to rank the anomalies as discussed in the implementations above. Namely, similarity measures may be determined and the vectors ranked according to their similarity measure with respect to representation vectors of known false positives. The anomalies may then be automatically labeled as false positives in any of the manners described above.

III. Historical Data Handling

Figure 6A:
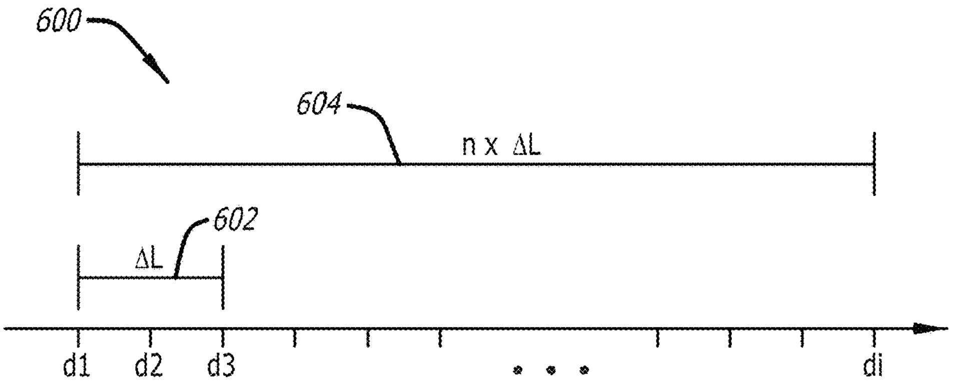
FIGS. 6A-6C illustrate three approaches for handling data for iterative training of a machine learning model to perform a false positive suppression procedure according to an implementation of the disclosure.
Figure 6B:
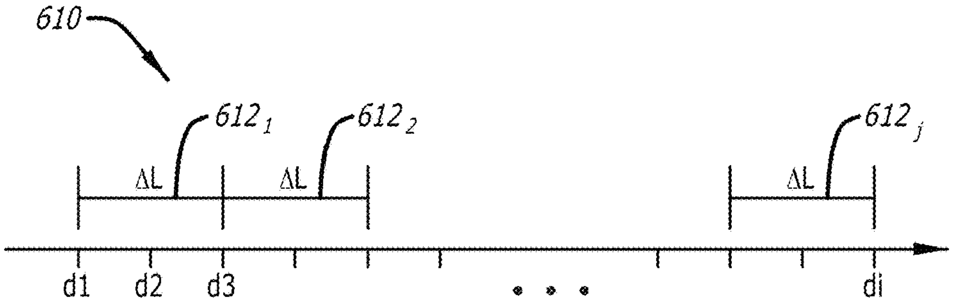
Figure 6C:
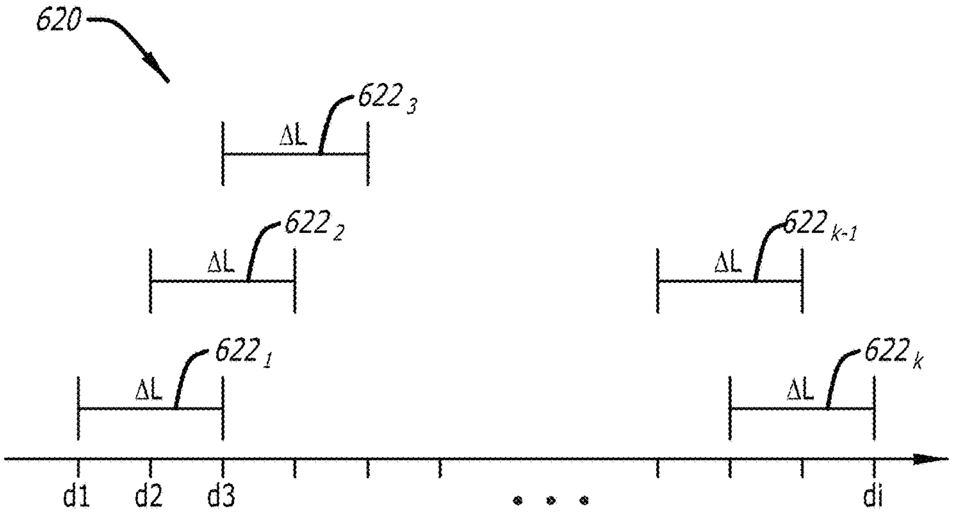

FIGS. 6A-6C illustrate three approaches for handling data for iterative training of a self-supervised model to perform a false positive suppression procedure is shown according to an implementation of the disclosure. Referring to FIG. 6A, a first approach 600 for handling data for iterative training of a self-supervised model to perform a false positive suppression procedure is shown that includes utilizing the entire span of anomaly history 604 that includes di-di, each representing the time period of a single day. The entire span of anomaly history 604 is illustrated by n×ΔL, where ΔL represents a window of time 602. As noted with respect to FIG. 4, the entire span of anomaly history 604 includes at least a subset of detected anomalies that have been marked as false positives via user feedback.

Referring to FIG. 6B, a second approach 610 for handling data for iterative training of a self-supervised model to perform a false positive suppression procedure is shown that includes performing training at intervals $\mathbf{612_1}$-$\mathbf{612_j}$ of ΔL. In some examples, the second approach includes disregarding all previous data for each interval of ΔL. Finally, referring to FIG. 6C, a third approach 620 for handling data for iterative training of a self-supervised model to perform a false positive suppression procedure is shown that includes incrementally a sliding window $\mathbf{622_1}$-$\mathbf{622_k}$ of ΔL. FIG. 6C illustrates that each adjacent sliding window $\mathbf{622_1}$-$\mathbf{622_k}$ incorporates a portion of the prior sliding window so that the training retains past knowledge while adapting to evolving behaviors and emerging patterns.

IV. Sample Graphical User Interfaces

Figure 7A:
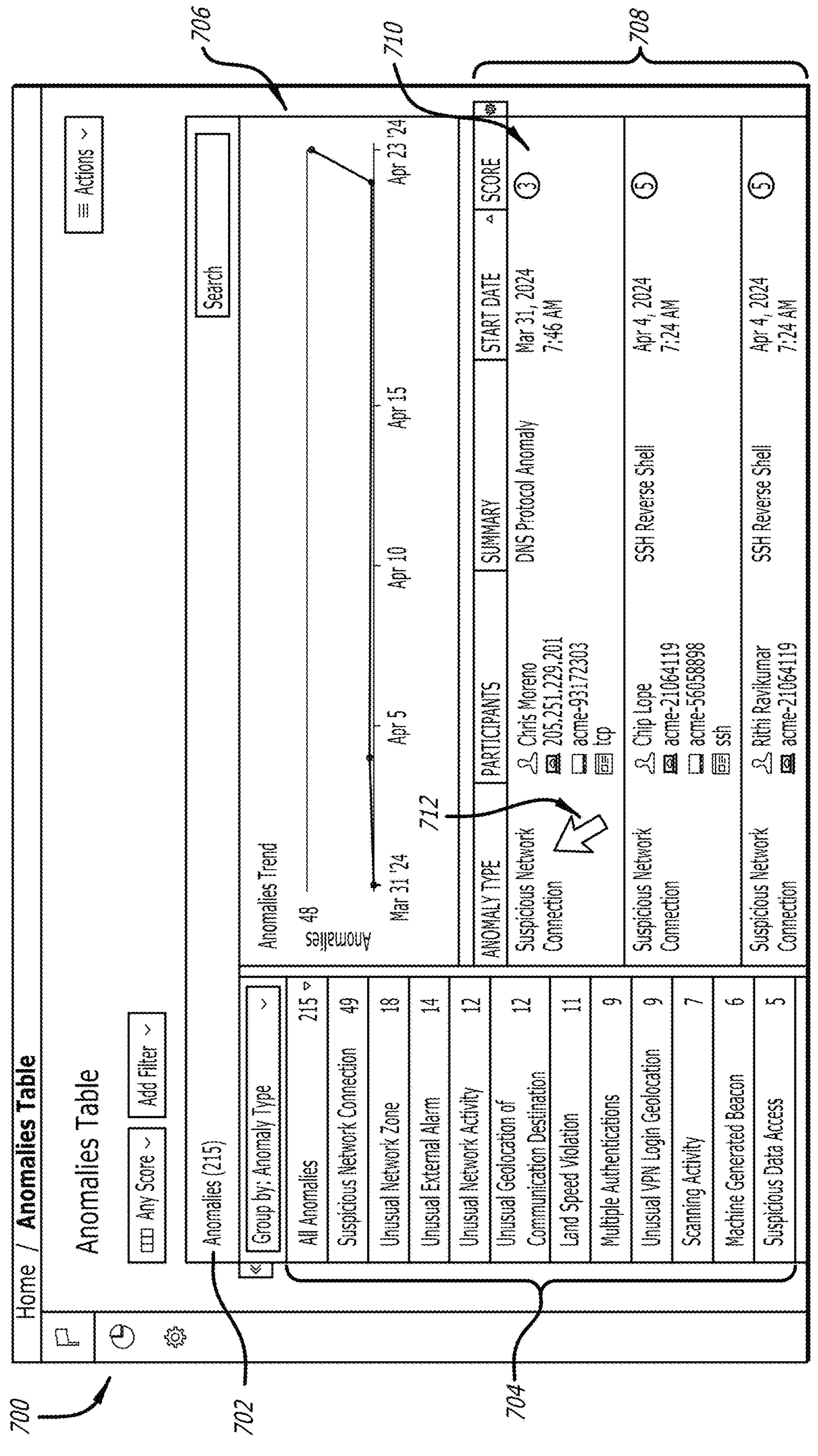
FIG. 7A illustrates a first graphical user interface (GUI) of an anomalies table dashboard providing a listing of detected anomalies and details thereof according to an implementation of the disclosure.

Referring to FIG. 7A, a first graphical user interface (GUI) of an anomalies table dashboard providing a listing of detected anomalies and details thereof is shown according to an implementation of the disclosure. The GUI 700 of FIG. 7A may be displayed in an internet browser or within an application (e.g., "app," which may comprise software or logic) operating on a network device. The GUI 700 may represent a dashboard, and specifically, an "Anomalies Table." The GUI 700 may include an indication of a number of anomalies detected 702 and a side panel 704 that lists anomaly types and is configured to receive user input resulting in a filtering of anomalies displayed in other portions of the GUI 700. As shown in the example of FIG. 7A, the anomaly type "Suspicious Network Connection" has been selected.

The GUI 700 may also include a trend. portion 706 illustrating a number of anomalies detected over a time period, e.g., Mar. 31, 2024, through Apr. 23, 2024. Further, the GUI 700 may include an anomaly listing 708 that includes a plurality of rows of alerts, where an alert corresponds to a detected anomaly and provides information about the anomaly such as: an anomaly type; participants (e.g., users, entities, etc.); a summary of the anomaly; a start date; an anomaly score; etc. FIG. 7A illustrates that the row 710 (or alert 710) has been selected through user input 712.

Figure 7B:
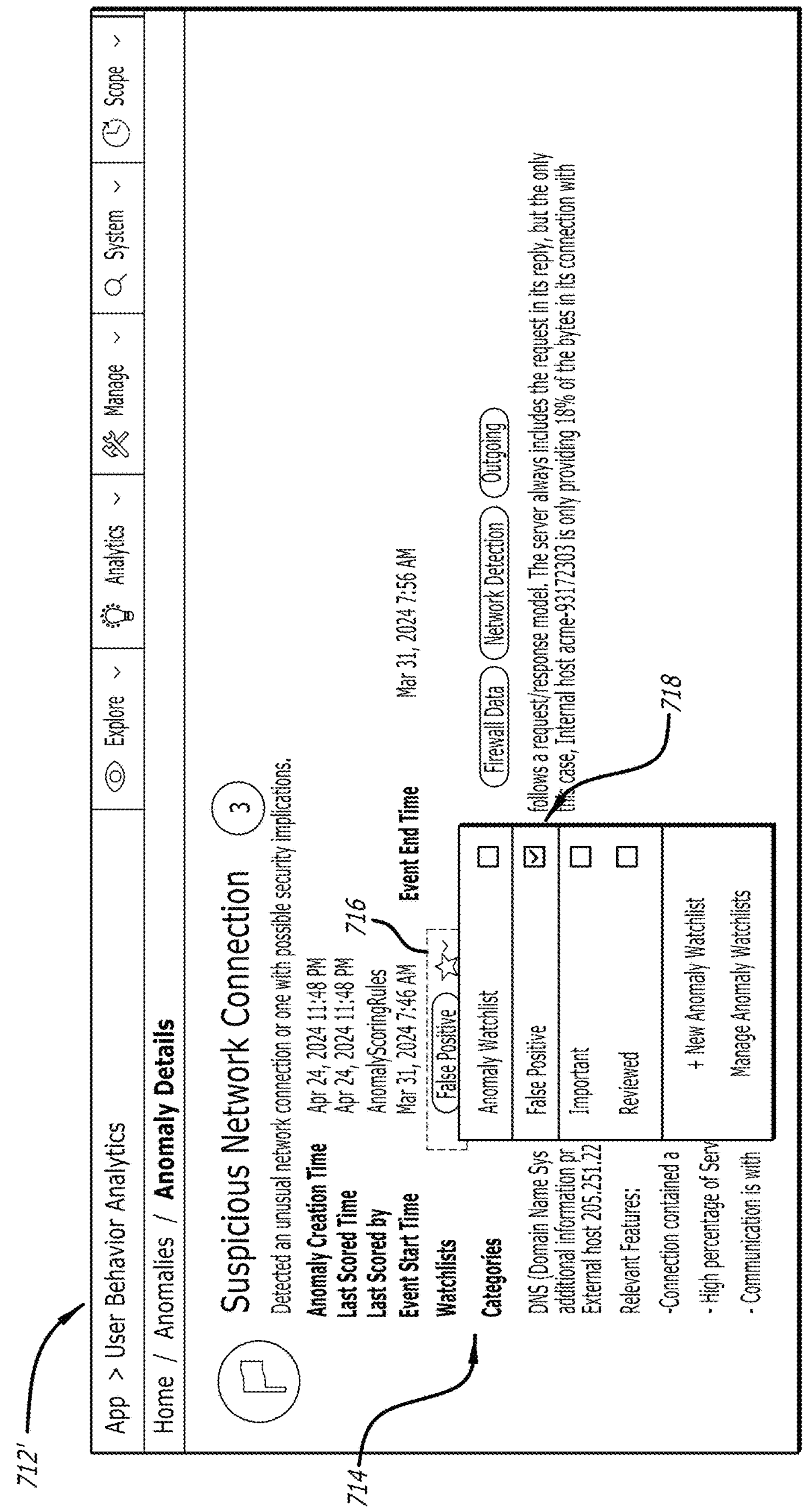
FIG. 7B illustrates a second GUI configured to receive user feedback indicative of an anomaly listed in FIG. 7A is a false positive according to an implementation of the disclosure.

Referring now to FIG. 7B, a second GUI configured to receive user feedback indicative of an anomaly listed in FIG. 7A is a false positive is shown according to an implementation of the disclosure. FIG. 7B illustrates a second GUI 712' that may be displayed in an internet browser or within an application operating on a network device, e.g., in the same manner as the GUI 700.

The GUI 712' represents a continuation from the GUI 700 of FIG. 7A, which may comprise a revised or new screen in response to receipt of the user input 712 selecting the alert 710. In particular, the GUI 712' may include a data or body portion that provides additional information comprising the alert 710. In particular, the GUI 712' may include a user input (UI) element 716 that is configured to receive user input corresponding to a selection of a watch list on which to place the alert. As shown, the "False Positive" watchlist 718 was selected.

FIGS. 7A-7B illustrate one example that may include, if on day one, a SOC analyst views the GUI 700 and provides user input selecting alert 710, which corresponds to the DNS Protocol Anomaly incurred by device acme-93172303. The SOC analyst then provides user input tagging the alert 710 as a false positive by adding it to the False Positive watchlist. As discussed above, a self-supervised model may be deployed to analyze alerts of subsequently detected anomalies, and automatically label at least a subset of those as false positives similar to the alert 710. As noted above, the auto-detected false positives may be flagged for user review.

FIG. 8 illustrates a third GUI of an anomalies table providing a listing of detected anomalies, details thereof and automated false positive identified indicator according to an implementation of the disclosure. The GUI 800 illustrates an anomalies table, which may be an anomalies table that is later in time relative to the anomalies table 708 of FIG. 7A. Specifically, the anomalies table 800 includes a row 802 (alert 802) that corresponds to the alert 710 discussed above and modified to further include a column illustrating an anomaly watchlist label (or "false positive" flag) 804. The alert 802 is shown to have a label 806 of "False Positive," which as described with respect to FIGS. 7A-7B was a result of user input. FIG. 8 also illustrates that additional alerts corresponding to anomalies that occurred later in time relative to the alert 802, with many of the later-in-time alerts being automatically labeled as "False Positive," by the false positive suppression subsystem (where the auto-labeling is denoted by reference number 808).

V. System Architecture-Second Implementation

Figure 9:
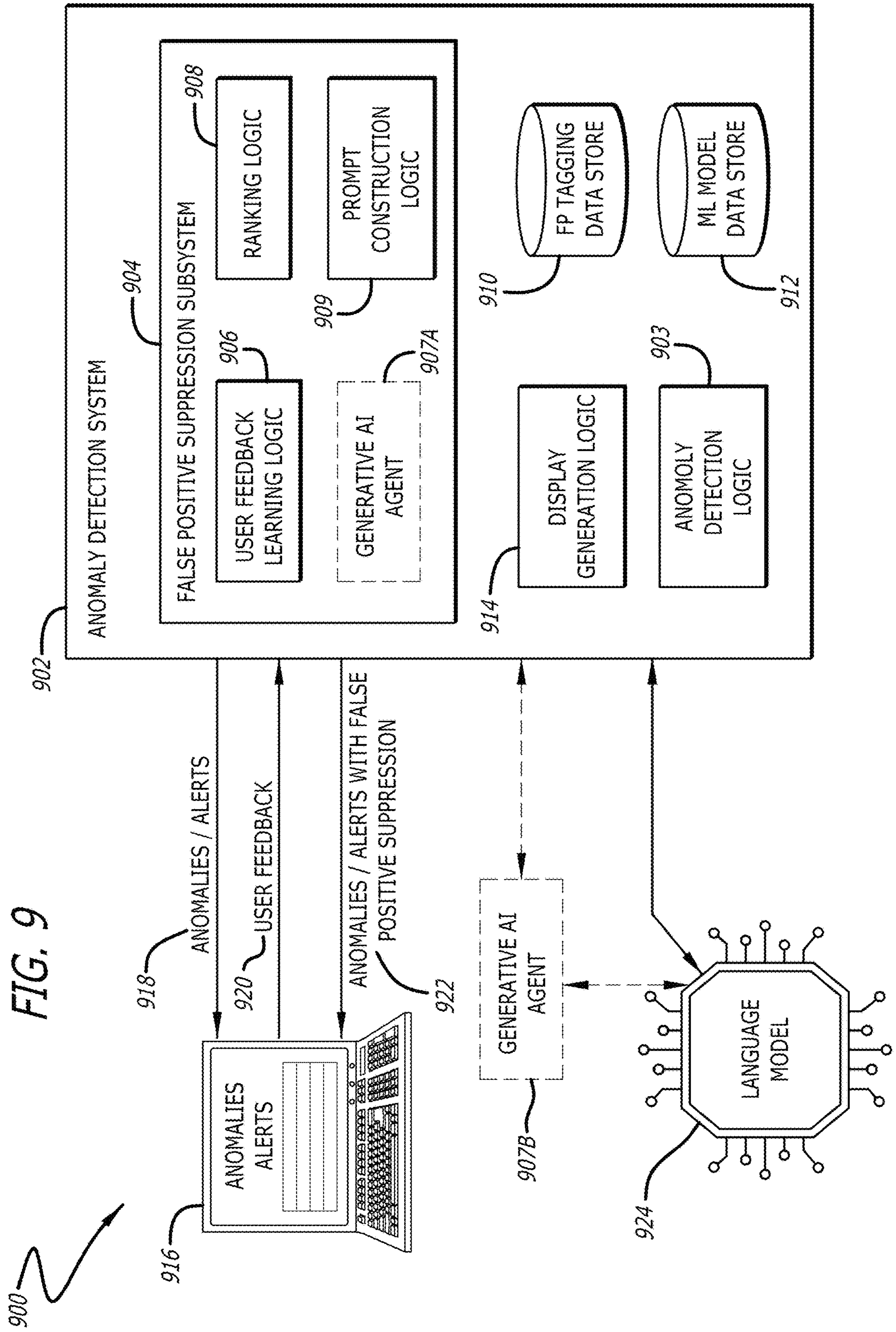
FIG. 9 is a block diagram illustrating a second networked environment configured with network components and logic including an anomaly detection system, a false positive suppression subsystem, and a language model according to an implementation of the disclosure.

Referring to FIG. 9, a block diagram illustrating a second networked environment configured with network components and logic including an anomaly detection system, a false positive suppression subsystem, and a language model is shown according to an implementation of the disclosure. The networked environment 900 includes an anomaly detection system 902 that may be comprised of logic modules configured to perform specific and particularized operations upon execution by one or more processors. The logic may include an anomaly detection logic 903, a false positive suppression subsystem 904 that includes a user feedback learning logic 906, an optional generative artificial intelligence (AI) agent 907A, a ranking logic 908, and a prompt construction logic 909, and a display generation logic 914. The anomaly detection system 902 may also include a false positive tagging data store 910 and a machine learning model data store 912. Many of the components of illustrated in FIG. 9 correspond to those illustrated in FIG. 1 and discussed above. As a result, those components will not be discussed below unless to describe alternative or additional functionality or operability.

FIG. 9 illustrates that the anomaly detection system 902 may be communicatively coupled to a generative AI agent 907B, which may be an alternative to the inclusion of the generative AI agent 907A. As will be discussed below, the generative AI agents 907A-907B are utilized to interface with the large language model (LLM) 924 by providing constructed prompts to the language model 924 and receive responses therefrom. Thus, in some instances, the generative AI agent 907A may be a component of the false positive suppression subsystem 904 and interface with the language model 924 via one or more application programming interfaces (APIs). Alternatively, the false positive suppression subsystem 904 may be configured to provide constructed prompts to and receive responses from the language model 924 from the generative AI agent 907B via a first API, where the generative AI agent 907B interfaces with the language model 924 via either the first API or a second API different than the first API. For convenience and the sake of clarity, the following description will reference the generative AI agent 907A but such functionality and operability may equally apply to the generative AI agent 907B unless otherwise noted.

The prompt construction logic 909 may be configured, upon execution by one or more processors, to construct a prompt to be provided to the language model 924. In some instances, the prompt construction logic 909 may construct a prompt that includes one or more anomalies to assess as to whether each represents a false positive, an example for one-shot learning as context (e.g., an anomaly previously identified as a false positive), a specified task such as an instruction to conclude whether each anomaly is a false positive and/or summarize features that indicate whether the anomaly is likely a false positive or a legitimate anomaly, a specified output format (such as a table having a first column that provide a summary of features considered by the language model 924 and how the language model 924 considered each and a second column providing the conclusion in the form of yes, no, or unknown), etc.

In some instances, the prompt may be structured as a chain-of-thought (CoT) prompt, which may include instructing the language model 924 to break down the tasks into smaller sub-tasks, instructing the language model 924 to iterate through the tasks and refine its responses. Information utilized in constructing prompts may be stored in the ML model data store 912 along with prompts and corresponding responses.

In some embodiments, the term language model may refer to an artificial intelligence (AI) system that is based on a neural network architecture, typically a transformer architecture. In today's technology environment, the terms "language model" and "large language model" are often used interchangeably. However, the naming convention of "large" merely refers to the scale of the language model, which refers to the number of parameters for which the model accounts. The number of parameters typically range from millions to billions, with some even accounting for trillions of parameters. Thus, as used here, the term "language model" encompasses models having varying scales such as those that account for millions, billions, or trillions of parameters.

In some implementations, the language model 924 may be trained on a large corpus of text data to generate human-readable text and often autonomously generate text content in response to a provided prompt. The language model 924 may be fine-tuned on specific training data such as anomalies labeled as false positives or legitimate and be configured to determine whether an anomaly is likely a legitimate anomaly or a false positive. In some instances, the prompt provided to the language model 924 may include the anomaly and/or additional information about the anomaly akin to an alert such as a false positive flag, an anomaly name, an anomaly summary, a model/rule name that contributed to the detection of the anomaly, feature names, feature values, an anomaly score, an event timestamp of the anomaly, etc.

Figure 10:
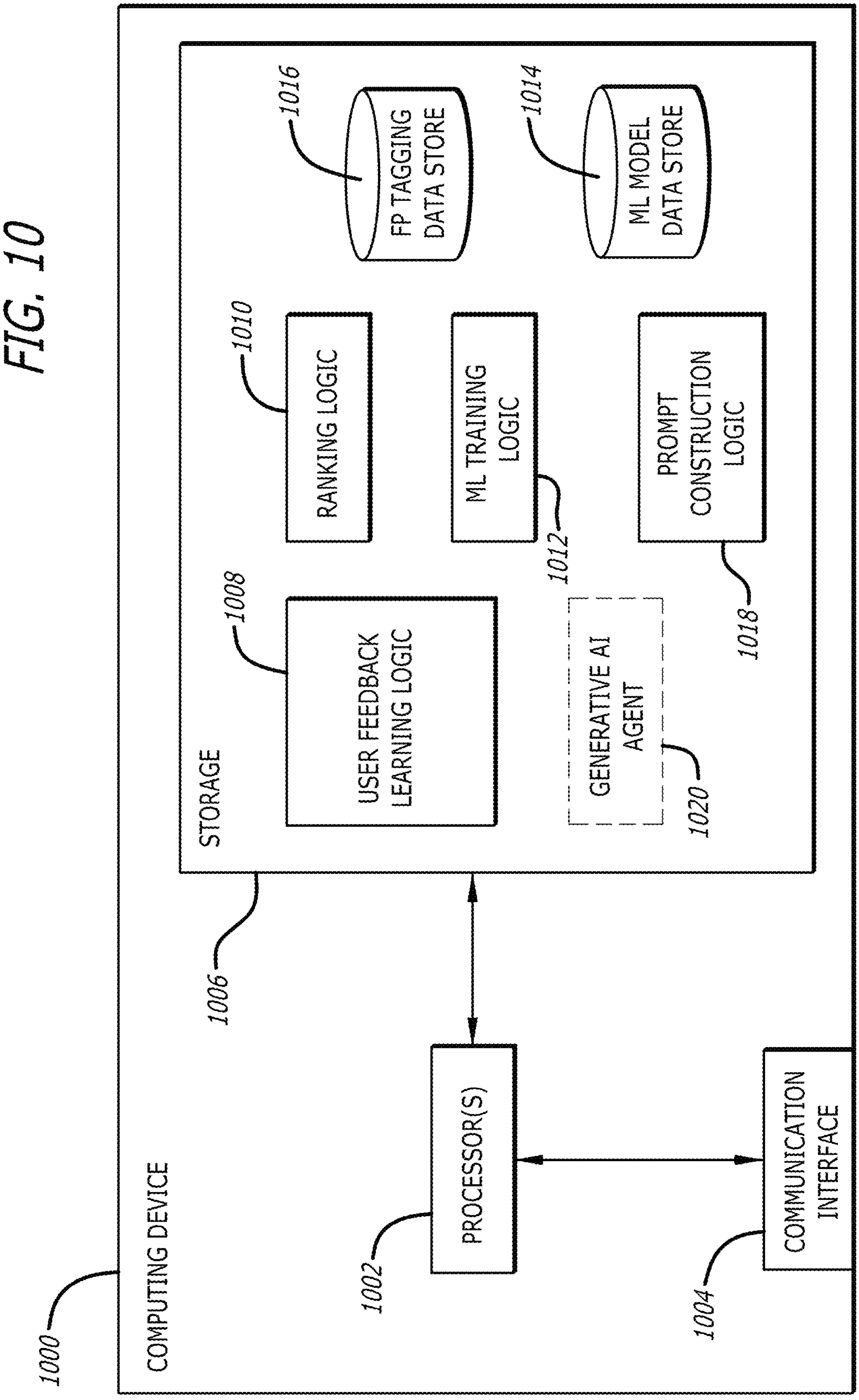
FIG. 10 is a logic diagram illustrating logic components of a false positive suppression subsystem including a generative artificial intelligence (AI) agent according to an implementation of the disclosure.

Referring to FIG. 10, a logic diagram illustrating logic components of a false positive suppression subsystem including a generative artificial intelligence (AI) agent is shown according to an implementation of the disclosure. In the example shown in FIG. 10, a computing device 1000 includes one or more processors 1002 that is communicatively coupled to a communication interface 1004 and storage 1006, which may be non-transitory computer readable medium. The storage 1006 may have stored thereon logic, e.g., in the form of computer-executable instructions, that, when executed by the processor 1002, cause the processor 1002 to perform the methods described herein.

As used herein, one implementation of a computing device may be server device that has a memory for storing program code instructions and a hardware processor for executing the instructions. The server device can further include other physical components, such as a network interface or components for input and output. The storage 1006 may include components that may form a portion of an anomaly detection system, such as the anomaly detection system 902 of FIG. 9. In particular, the logic components illustrated in FIG. 10 include a user feedback learning logic 1008, a ranking logic 1010, a machine learning (ML) training logic 1012, a prompt construction logic 1018, and a generative AI agent 1020. Additionally, the storage 1006 may be comprised of a ML model data store 1014 and a FP tagging data store 1016.

In some examples, the data stores 1014, 1016 may be stored elsewhere and be accessible to the logic models stored in the storage 1006. Examples of storage 1006 include non-transitory computer-readable mediums, such as a magnetic or optical storage disk or a flash or solid-state memory, from which the program code can be loaded into the memory of the computing device 1000 for execution.

VI. Architectural Flow-Second Implementation

Figure 11:
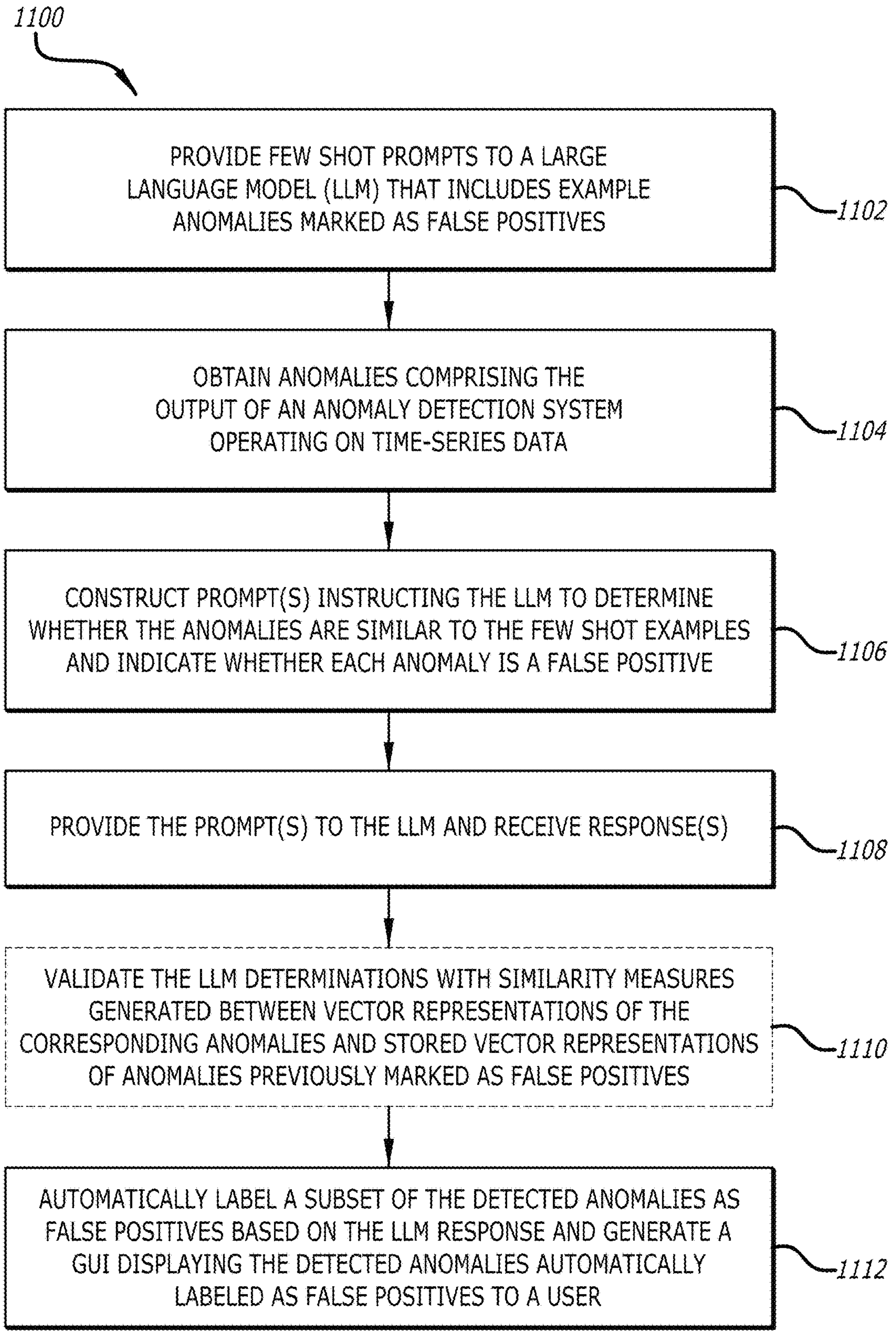
FIG. 11 is a flowchart illustrating example operations for performing a false positive suppression procedure including utilization of a language model according to an implementation of the disclosure.

FIG. 11 is a flowchart illustrating example operations for performing a false positive suppression procedure including utilization of a language model according to an implementation of the disclosure. Each block illustrated in FIG. 11 represents an operation in the process 1100 performed by, for example, the false suppression subsystem 902 as shown in FIG. 9. It should be understood that not every operation illustrated in FIG. 11 is required. In fact, certain operations may be optional to complete aspects of the process 1100. The discussion of the operations of process 1100 may be done so with reference to any of the previously described figures.

The process 1100 may begin with providing few shot prompts to a large language model (LLM) that includes example anomalies marked as false positives in order to fine-tune the LLM (block 1102). Following the optional fine-tuning operation, anomalies are obtained that comprise the output of an anomaly detection system operating on time-series data, e.g., the anomaly detection logic 103 of FIG. 1 (block 1104). Logic may then automatically construct one or more prompts that instruct the LLM to determine whether each of the anomalies are false positives (block 1106). As discussed above, the prompt(s) may include one or more anomalies that are to be assessed as to whether each represents a false positive, an example for one-shot learning as context (e.g., an anomaly previously identified as a false positive), a specified task (e.g., provide conclusion and/or summarize features considered), a specified output format, etc. Information of the anomaly may be provided including: an anomaly type; participants (e.g., users, entities, etc.); a summary of the anomaly; a start date; an anomaly score; etc.

The prompt(s) may then be provided to the LLM for processing and one or more responses received (block 1108). The provision of the prompt(s) may be performed by a generative AI agent such as either of the generative AI agents 907A-907B as shown in FIG. 9. In some examples, an optional operation of validating the LLM responses may be performed that includes comparing the LLM response in assessing a particular anomaly with the similarity measures generated between a vector representation of the particular anomaly and stored vector representations of anomalies previously marked as false positives (block 1110). In some instances, the two approaches may be weighted such that either approach holds a higher weight and decides the validation step. For example, the similarity measure approach may hold a higher weight such that the LLM response is only provided to a user if it agrees with the similarity measure approach. In other examples, the results of both approaches may be provided to a user with each result labelled so that the user may utilize either or both results.

Based on the LLM responses, a subset of the detected anomalies may be automatically labeled as false positives and a GUI may be generated displaying the detected anomalies automatically labeled as false positives to a user (block 1112). Additional detail as to the automatic labelling and GUI displays is provided above with respect to at least FIGS. 4, 5, and 7A-8.

VIII. General System Methodology

Figure 12:
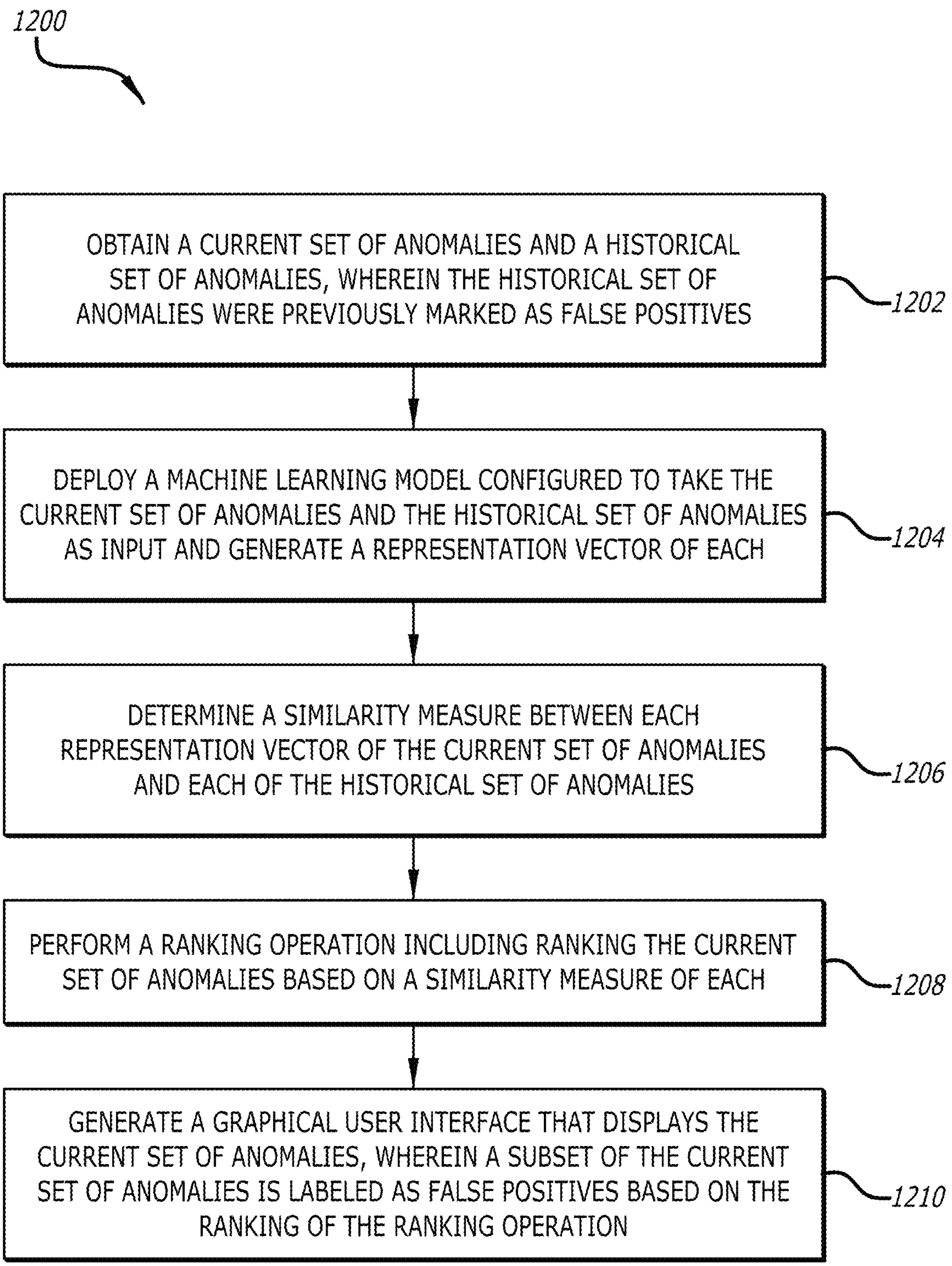
FIG. 12 is a flowchart illustrating an example operations for performing a false positive suppression methodology according to an implementation of the disclosure.

Referring to FIG. 12, a flowchart illustrating an example operations for performing a false positive suppression methodology is shown according to an implementation of the disclosure. The example process 1200 can be implemented, for example, by a computing device that comprises a processor and a non-transitory computer-readable medium. The non-transitory computer readable medium can be storing instructions that, when executed by the processor, can cause the processor to perform the operations of the illustrated process 1200. Alternatively or additionally, the process 1200 can be implemented using a non-transitory computer-readable medium storing instructions that, when executed by one or more processors, cause the one or more processors to perform the operations of the process 1200 of FIG. 12.

Each block illustrated in FIG. 12 represents an operation in the process 1200 performed by, for example, a false positive suppression subsystem. It should be understood that not every operation illustrated in FIG. 12 is required. In fact, certain operations may be optional to complete aspects of the process 1200. The discussion of the operations of process 1200 may be done so with reference to any of the previously described figures. The process 1200 begins with an operation of obtaining a current set of anomalies and a historical set of anomalies, wherein the historical set of anomalies were previously marked as false positives (block 1202). A machine learning model configured to take the current set of anomalies and the historical set of anomalies as input is deployed resulting in the generation of a representation vector of each of the current set of anomalies and the historical set of anomalies (block 1204).

A similarity measure between each representation vector of the current set of anomalies and each of the historical set of anomalies may then be determined before a ranking operation is performed that includes ranking the current set of anomalies based on a similarity measure of each (blocks 1206-1208). Further, a graphical user interface (GUI) may be generated that displays the current set of anomalies, wherein a subset of the current set of anomalies is labeled as false positives based on the ranking of the ranking operation.

In some implementations, the machine learning model is a word embedding model. In such instances, the word embedding model may be augmented with a corpus of anomalies using a self-supervised learning process, and wherein the self-supervised learning training includes generation of pseudo-labels form the corpus of anomalies. In other implementations, the machine learning model is a transformer-based encoder-decoder.

In some examples, the historical set of anomalies were previously marked as false positives through user feedback provided by an initial GUI. The ranking operation may include listing the current set of anomalies in order of similarity measure from highest to lowest and selecting the subset of the current set of anomalies to be labeled as false positives as a top predetermined number of anomalies from the listing. In other examples, the ranking operation may include selecting the subset of the current set of anomalies to be labeled as false positives as anomalies having a similarity measure that satisfies a threshold comparison.

Figure 13:
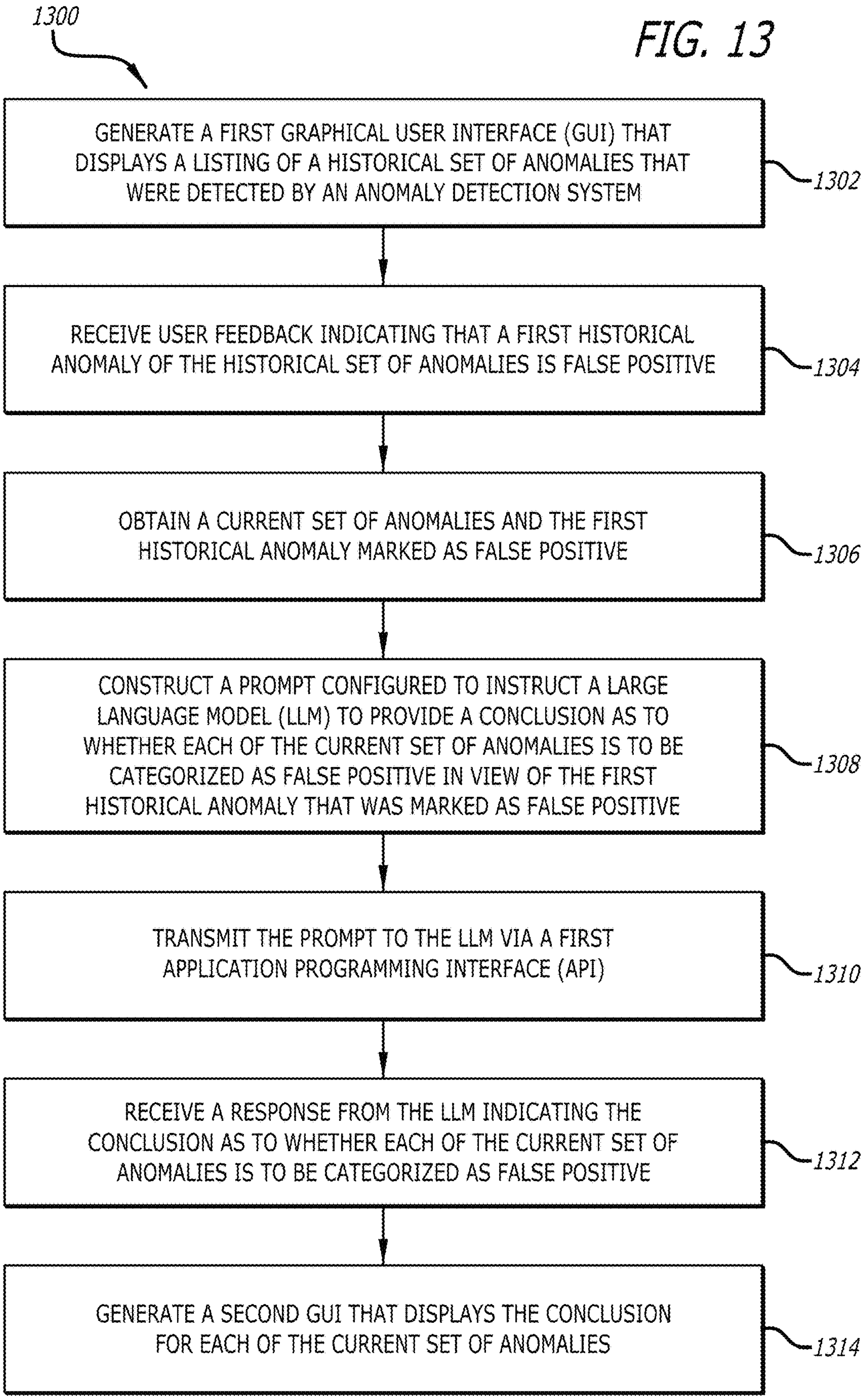
FIG. 13 is a flowchart illustrating an example operations for performing a false positive suppression methodology including deployment of a large learning model (LLM) according to an implementation of the disclosure.

Referring to FIG. 13, a flowchart illustrating an example operations for performing a false positive suppression methodology including deployment of a large learning model (LLM) is shown according to an implementation of the disclosure. The example process 1300 can be implemented, for example, by a computing device that comprises a processor and a non-transitory computer-readable medium. The non-transitory computer readable medium can be storing instructions that, when executed by the processor, can cause the processor to perform the operations of the illustrated process 1300. Alternatively or additionally, the process 1300 can be implemented using a non-transitory computer-readable medium storing instructions that, when executed by one or more processors, cause the one or more processors to perform the operations of the process 1300 of FIG. 13.

Each block illustrated in FIG. 13 represents an operation in the process 1300 performed by, for example, a false positive suppression subsystem. It should be understood that not every operation illustrated in FIG. 13 is required. In fact, certain operations may be optional to complete aspects of the process 1300. The discussion of the operations of process 1300 may be done so with reference to any of the previously described figures. The process 1300 begins with operations of generating a first graphical user interface (GUI) that displays a listing of a historical set of anomalies that were detected by an anomaly detection system and receiving user feedback indicating that a first historical anomaly of the historical set of anomalies is false positive (blocks 1302-1304).

Following receipt of the user feedback, the process 1300 includes obtaining a current set of anomalies and the first historical anomaly marked as false positive and constructing a prompt configured to instruct a large language model (LLM) to provide a conclusion as to whether each of the current set of anomalies is to be categorized as false positive in view of the first historical anomaly that was marked as false positive (blocks 1306-1380). The prompt is then transmitted to the LLM via a first application programming interface (API) and a response is received from the LLM indicating the conclusion as to whether each of the current set of anomalies is to be categorized as false positive (blocks 1310-1312). Further the process 1300 may include generating a second GUI that displays the conclusion for each of the current set of anomalies (block 1314).

In some examples, the process 1300 may include an operation of validating the conclusion as to whether each of the current set of anomalies is to be categorized as false positive based on with similarity measures generated between vector representations of the corresponding anomalies and stored vector representations of anomalies previously marked as false positives. In some instances, the second GUI includes a listing of the current set of anomalies comprising the output of an anomaly detection system, the conclusion as to whether each of the anomalies is to be categorized as false positive, and an anomaly previously detected by the anomaly detection system that was marked as false positive through receipt of user feedback.

The process 1300 may include an additional operation of, prior to providing the prompt to the LLM, performing a fine-tuning procedure on the LLM including providing a set of labeled example anomalies, constructing a fine-tuning prompt that provides instructions on classifying one or more additional unlabeled example anomalies as false positive or not, and transmitting the fine-tuning prompt to the LLM thereby initiating fine-tuning.

In some examples, constructing the prompt includes including a plurality of examples of historical anomalies with at least a subset labeled as false positives. The process 1300 may include an additional operation of performing a model quantization process on the LLM including converting one or more of a set of parameters forming the LLM from a first precision format to a second precision format, wherein the first precision format is a higher precision than the second precision format. In some instances, the second precision format is 8-bit integer (INT8), which represents each weight of the LLM occupying 8 bits (1 byte) of memory. The first precision format may be 32-bit floating point (FP32). Thus, by quantizing the LLM from a first precision format to INT8, the amount of memory required to store the LLM is reduced substantially. For example, quantizing from FP32 to INT8 results in a reduction of the amount of memory used by a factor of four (4). Therefore, quantizing the LLM results in an improvement to the processing of a computer due at least to the substantial reduction in memory usage. Additionally, as the quantized LLM is now deployed with lower precision, deployment of the quantized LLM to process data requires less energy, which further improves the processing of a computer by utilizing less resources.

In some examples, the quantization operation may be static quantization, which includes quantizing the weights and activations that form the LLM based on a fixed scaling factor. In other examples, the quantization operation may be dynamic quantization, which includes quantizing the weights based on a fixed scaling factor with the activations be quantized during inference.

In some examples, model quantization is implemented when an LLM (such as the LLM 924 of FIG. 9) is packaged with an anomaly detection system (such as the anomaly detection system 902 of FIG. 9). As a result of the packaging the LLM with the anomaly detection system, API calls to/from the LLM do not need to send data to outside of an enterprise network boundary. This occurs as the package operates within the enterprise network boundary. As a result, data privacy and confidentiality are maintained, which provides for compliance of legal requirements. The packaging also reduces the cost of API calls to LLM service providers.

In some examples, the weights of the LLM are quantized to Q4 level (4-bit integer) prior to the packaging of the LLM into the anomaly detection tools. Thus, the quantization is done statically and the precision level cannot be changed during run time. Since the model is quantized, existing users of detection tools do not need to increase the tool hosting infrastructure capacity to facilitate the LLM based false positive suppression feature, which enables easy adoption and deployment without the need to add computing resources.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 14:
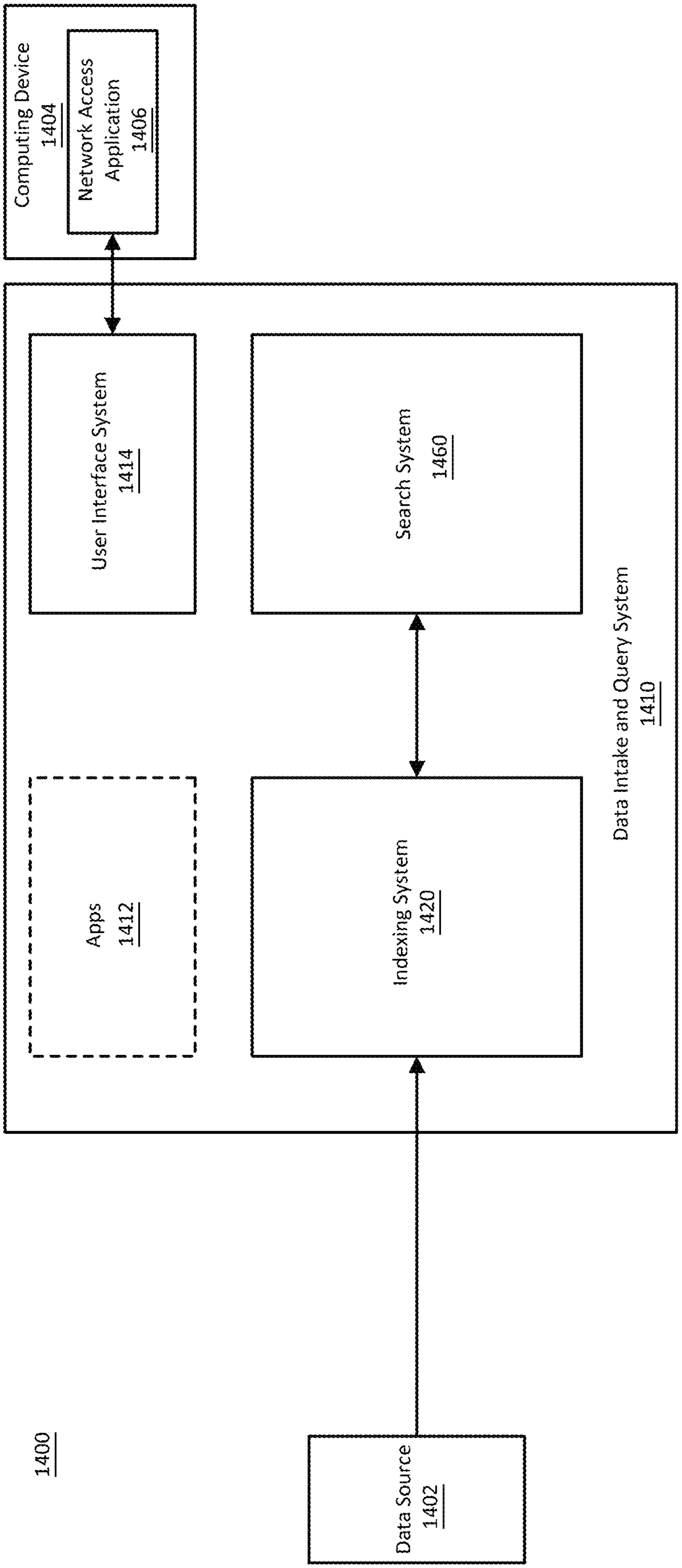
FIG. 14 is a block diagram illustrating an example computing environment that includes a data intake and query system according to an implementation of the disclosure.

FIG. 14 is a block diagram illustrating an example computing environment 1400 that includes a data intake and query system 1410. The data intake and query system 1410 obtains data from a data source 1402 in the computing environment 1400 and ingests the data using an indexing system 1420. A search system 1460 of the data intake and query system 1410 enables users to navigate the indexed data. Though drawn with separate boxes in FIG. 14, in some implementations the indexing system 1420 and the search system 1460 can have overlapping components. A computing device 1404, running a network access application 1406, can communicate with the data intake and query system 1410 through a user interface system 1414 of the data intake and query system 1410. Using the computing device 1404, a user can perform various operations with respect to the data intake and query system 1410, such as administration of the data intake and query system 1410, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1410 can further optionally include apps 1412 that extend the search, analytics, and/or visualization capabilities of the data intake and query system 1410.

The data intake and query system 1410 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1410 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1410 can be executed on a single computing device, or execution of the program code can be distributed over multiple computing devices. For example, the program code can include instructions for both indexing and search components (which may be part of the indexing system 1420 and/or the search system 1460, respectively), which can be executed on a computing device that also provides the data source 1402. As another example, the program code can be executed on one computing device, where execution of the program code provides both indexing and search components, while another copy of the program code executes on a second computing device that provides the data source 1402. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1402 of the computing environment 1400 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1402 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1420 obtains machine date from the data source 1402 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1420 does not require prior knowledge of the structure of incoming data (e.g., the indexing system 1420 does not need to be provided with a schema describing the data). Additionally, the indexing system 1420 retains a copy of the data as it was received by the indexing system 1420 such that the original data is always available for searching (e.g., no data is discarded, though, in some examples, the indexing system 1420 can be configured to do so).

The search system 1460 searches the data stored by the indexing 1420 system. As discussed in greater detail below, the search system 1460 enables users associated with the computing environment 1400 (and possibly also other users) to navigate the data, generate reports, and visualize search results in "dashboards" output using a graphical interface. Using the facilities of the search system 1460, users can obtain insights about the data, such as retrieving events from an index, calculating metrics, searching for specific conditions within a rolling time window, identifying patterns in the data, and predicting future trends, among other examples. To achieve greater efficiency, the search system 1460 can apply map-reduce methods to parallelize searching of large volumes of data. Additionally, because the original data is available, the search system 1460 can apply a schema to the data at search time. This allows different structures to be applied to the same data, or for the structure to be modified if or when the content of the data changes. Application of a schema at search time may be referred to herein as a late-binding schema technique.

The user interface system 1414 provides mechanisms through which users associated with the computing environment 1400 (and possibly others) can interact with the data intake and query system 1410. These interactions can include configuration, administration, and management of the indexing system 1420, initiation and/or scheduling of queries that are to be processed by the search system 1460, receipt or reporting of search results, and/or visualization of search results. The user interface system 1414 can include, for example, facilities to provide a command line interface or a web-based interface.

Users can access the user interface system 1414 using a computing device 1404 that communicates with data intake and query system 1410, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1400. For example, a person can log in as a particular user and, using the user's digital information, can access the data intake and query system 1410. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1404 can provide a human-machine interface through which a person can have a digital presence in the computing environment 1400 in the form of a user. The computing device 1404 is an electronic device having one or more processors and a memory capable of storing instructions for execution by the one or more processors. The computing device 1404 can further include input/output (I/O) hardware and a network interface. Applications executed by the computing device 1404 can include a network access application 1406, such as a web browser, which can use a network interface of the client computing device 1404 to communicate, over a network, with the user interface system 1414 of the data intake and query system 1410. The user interface system 1414 can use the network access application 1406 to generate user interfaces that enable a user to interact with the data intake and query system 1410. A web browser is one example of a network access application. A shell tool can also be used as a network access application. In some examples, the data intake and query system 1410 is an application executing on the computing device 1406. In such examples, the network access application 1406 can access the user interface system 1414 without going over a network.

The data intake and query system 1410 can optionally include apps 1412. An app of the data intake and query system 1410 is a collection of configurations, knowledge objects (a user-defined entity that enriches the data in the data intake and query system 1410), views, and dashboards that may provide additional functionality, different techniques for searching the data, and/or additional insights into the data. The data intake and query system 1410 can execute multiple applications simultaneously. Example applications include an information technology service intelligence application, which can monitor and analyze the performance and behavior of the computing environment 1400, and an enterprise security application, which can include content and searches to assist security analysts in diagnosing and acting on anomalous or malicious behavior in the computing environment 1400.

Though FIG. 14 illustrates only one data source, in practical implementations, the computing environment 1400 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1400, the data intake and query system 1410 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1400 can include on-prem and cloud-based computing resources, or only cloud-based resources. For example, an entity may have on-prem computing devices and a private cloud. In this example, the entity operates the data intake and query system 1410 and can choose to execute the data intake and query system 1410 on an on-prem computing device or in the cloud. In another example, a provider entity operates the data intake and query system 1410 in a public cloud and provides the functionality of the data intake and query system 1410 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1410. In some implementations, the entity providing the data intake and query system 1410 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1410, and a third entity can subscribe to the services of the second provider entity in order to use the functionality of the data intake and query system 1410. In this example, the data sources are associated with the third entity, users accessing the data intake and query system 1410 are associated with the third entity, and the analytics and insights provided by the data intake and query system 1410 are for purposes of the third entity's operations.

Figure 15:
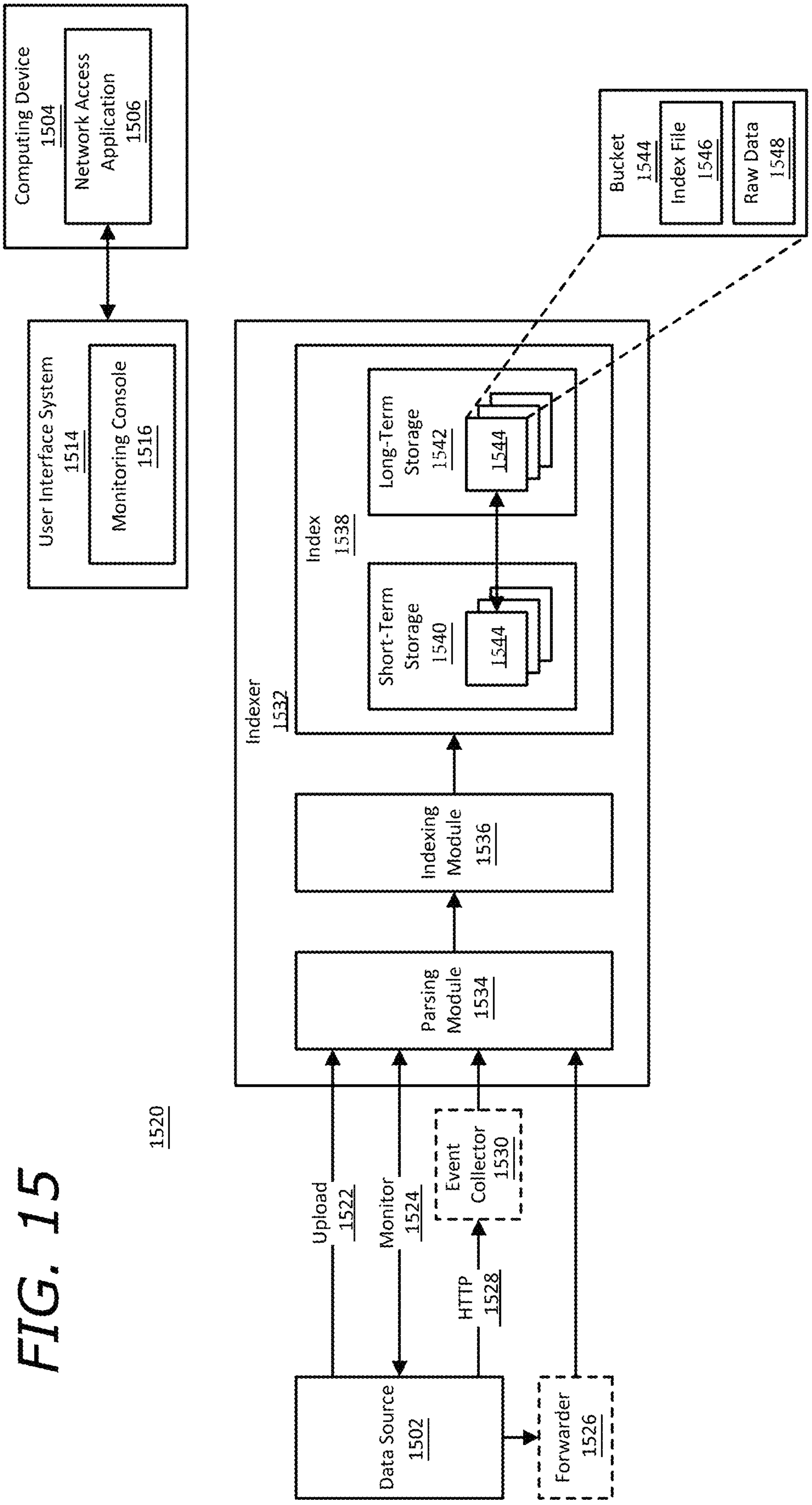
FIG. 15 is a block diagram illustrating in greater detail an example of an indexing system of a data intake and query system, such as the data intake and query system of FIG. 14 according to an implementation of the disclosure.

FIG. 15 is a block diagram illustrating in greater detail an example of an indexing system 1520 of a data intake and query system, such as the data intake and query system 1410 of FIG. 14. The indexing system 1520 of FIG. 15 uses various methods to obtain machine data from a data source 1502 and stores the data in an index 1538 of an indexer 1532. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1520 enables the data intake and query system to obtain the machine data produced by the data source 1502 and to store the data for searching and retrieval.

Users can administer the operations of the indexing system 1520 using a computing device 1504 that can access the indexing system 1520 through a user interface system 1514 of the data intake and query system. For example, the computing device 1504 can be executing a network access application 1506, such as a web browser or a terminal, through which a user can access a monitoring console 1516 provided by the user interface system 1514. The monitoring console 1516 can enable operations such as: identifying the data source 1502 for data ingestion; configuring the indexer 1532 to index the data from the data source 1532; configuring a data ingestion method; configuring, deploying, and managing clusters of indexers; and viewing the topology and performance of a deployment of the data intake and query system, among other operations. The operations performed by the indexing system 1520 may be referred to as "index time" operations, which are distinct from "search time" operations that are discussed further below.

The indexer 1532, which may be referred to herein as a data indexing component, coordinates and performs most of the index time operations. The indexer 1532 can be implemented using program code that can be executed on a computing device. The program code for the indexer 1532 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1532. In some implementations, the indexer 1532 executes on the computing device 1504 through which a user can access the indexing system 1520. In some implementations, the indexer 1532 executes on a different computing device than the illustrated computing device 1504.

The indexer 1532 may be executing on the computing device that also provides the data source 1502 or may be executing on a different computing device. In implementations wherein the indexer 1532 is on the same computing device as the data source 1502, the data produced by the data source 1502 may be referred to as "local data." In other implementations the data source 1502 is a component of a first computing device and the indexer 1532 executes on a second computing device that is different from the first computing device. In these implementations, the data produced by the data source 1502 may be referred to as "remote data." In some implementations, the first computing device is "on-prem" and in some implementations the first computing device is "in the cloud." In some implementations, the indexer 1532 executes on a computing device in the cloud and the operations of the indexer 1532 are provided as a service to entities that subscribe to the services provided by the data intake and query system.

For a given data produced by the data source 1502, the indexing system 1520 can be configured to use one of several methods to ingest the data into the indexer 1532. These methods include upload 1522, monitor 1524, using a forwarder 1526, or using HyperText Transfer Protocol (HTTP 1528) and an event collector 1530. These and other methods for data ingestion may be referred to as "getting data in" (GDI) methods.

Using the upload 1522 method, a user can specify a file for uploading into the indexer 1532. For example, the monitoring console 1516 can include commands or an interface through which the user can specify where the file is located (e.g., on which computing device and/or in which directory of a file system) and the name of the file. The file may be located at the data source 1502 or maybe on the computing device where the indexer 1532 is executing. Once uploading is initiated, the indexer 1532 processes the file, as discussed further below. Uploading is a manual process and occurs when instigated by a user. For automated data ingestion, the other ingestion methods are used.

The monitor 1524 method enables the indexing system 1502 to monitor the data source 1502 and continuously or periodically obtain data produced by the data source 1502 for ingestion by the indexer 1532. For example, using the monitoring console 1516, a user can specify a file or directory for monitoring. In this example, the indexing system 1502 can execute a monitoring process that detects whenever the file or directory is modified and causes the file or directory contents to be sent to the indexer 1532. As another example, a user can specify a network port for monitoring. In this example, a monitoring process can capture data received at or transmitting from the network port and cause the data to be sent to the indexer 1532. In various examples, monitoring can also be configured for data sources such as operating system event logs, performance data generated by an operating system, operating system registries, operating system directory services, and other data sources.

Monitoring is available when the data source 1502 is local to the indexer 1532 (e.g., the data source 1502 is on the computing device where the indexer 1532 is executing). Other data ingestion methods, including forwarding and the event collector 1530, can be used for either local or remote data sources.

A forwarder 1526, which may be referred to herein as a data forwarding component, is a software process that sends data from the data source 1502 to the indexer 1532. The forwarder 1526 can be implemented using program code that can be executed on the computer device that provides the data source 1502. A user launches the program code for the forwarder 1526 on the computing device that provides the data source 1502. The user can further configure the forwarder 1526, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1526 can provide various capabilities. For example, the forwarder 1526 can send the data unprocessed or can perform minimal processing on the data before sending the data to the indexer 1532. Minimal processing can include, for example, adding metadata tags to the data to identify a source, source type, and/or host, among other information, dividing the data into blocks, and/or applying a timestamp to the data. In some implementations, the forwarder 1526 can break the data into individual events (event generation is discussed further below) and send the events to a receiver. Other operations that the forwarder 1526 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1530 provides an alternate method for obtaining data from the data source 1502. The event collector 1530 enables data and application events to be sent to the indexer 1532 using HTTP 1528. The event collector 1530 can be implemented using program code that can be executing on a computing device. The program code may be a component of the data intake and query system or can be a standalone component that can be executed independently of the data intake and query system and operates in cooperation with the data intake and query system.

To use the event collector 1530, a user can, for example using the monitoring console 1516 or a similar interface provided by the user interface system 1514, enable the event collector 1530 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1502 as an alternative method to using a username and password for authentication.

To send data to the event collector 1530, the data source 1502 is supplied with a token and can then send HTTP 1528 requests to the event collector 1530. To send HTTP 1528 requests, the data source 1502 can be configured to use an HTTP client and/or to use logging libraries such as those supplied by Java, JavaScript, and .NET libraries. An HTTP client enables the data source 1502 to send data to the event collector 1530 by supplying the data, and a Uniform Resource Identifier (URI) for the event collector 1530 to the HTTP client. The HTTP client then handles establishing a connection with the event collector 1530, transmitting a request containing the data, closing the connection, and receiving an acknowledgment if the event collector 1530 sends one. Logging libraries enable HTTP 1528 requests to the event collector 1530 to be generated directly by the data source. For example, an application can include or link a logging library, and through functionality provided by the logging library manage establishing a connection with the event collector 1530, transmitting a request, and receiving an acknowledgement.

An HTTP 1528 request to the event collector 1530 can contain a token, a channel identifier, event metadata, and/or event data. The token authenticates the request with the event collector 1530. The channel identifier, if available in the indexing system 1520, enables the event collector 1530 to segregate and keep separate data from different data sources. The event metadata can include one or more key-value pairs that describe the data source 1502 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1530 extracts events from HTTP 1528 requests and sends the events to the indexer 1532. The event collector 1530 can further be configured to send events to one or more indexers. Extracting the events can include associating any metadata in a request with the event or events included in the request. In these implementations, event generation by the indexer 1532 (discussed further below) is bypassed, and the indexer 1532 moves the events directly to indexing. In some implementations, the event collector 1530 extracts event data from a request and outputs the event data to the indexer 1532, and the indexer generates events from the event data. In some implementations, the event collector 1530 sends an acknowledgement message to the data source 1502 to indicate that the event collector 1530 has received a particular request form the data source 1502, and/or to indicate to the data source 1502 that events in the request have been added to an index.

The indexer 1532 ingests incoming data and transforms the data into searchable knowledge in the form of events. In the data intake and query system, an event is a single piece of data that represents activity of the component represented in FIG. 15 by the data source 1502. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1532 can include a parsing module 1534 and an indexing module 1536 for generating and storing the events. The parsing module 1534 and indexing module 1536 can be modular and pipelined, such that one component can be operating on a first set of data while the second component is simultaneously operating on a second sent of data. Additionally, the indexer 1532 may at any time have multiple instances of the parsing module 1534 and indexing module 1536, with each set of instances configured to simultaneously operate on data from the same data source or from different data sources. The parsing module 1534 and indexing module 1536 are illustrated in FIG. 15 to facilitate discussion, with the understanding that implementations with other components are possible to achieve the same functionality.

The parsing module 1534 determines information about incoming event data, where the information can be used to identify events within the event data. For example, the parsing module 1534 can associate a source type with the event data. A source type identifies the data source 1502 and describes a possible data structure of event data produced by the data source 1502. For example, the source type can indicate which fields to expect in events generated at the data source 1502 and the keys for the values in the fields, and possibly other information such as sizes of fields, an order of the fields, a field separator, and so on. The source type of the data source 1502 can be specified when the data source 1502 is configured as a source of event data. Alternatively, the parsing module 1534 can determine the source type from the event data, for example from an event field in the event data or using machine learning techniques applied to the event data.

Other information that the parsing module 1534 can determine includes timestamps. In some cases, an event includes a timestamp as a field, and the timestamp indicates a point in time when the action represented by the event occurred or was recorded by the data source 1502 as event data. In these cases, the parsing module 1534 may be able to determine from the source type associated with the event data that the timestamps can be extracted from the events themselves. In some cases, an event does not include a timestamp and the parsing module 1534 determines a timestamp for the event, for example from a name associated with the event data from the data source 1502 (e.g., a file name when the event data is in the form of a file) or a time associated with the event data (e.g., a file modification time). As another example, when the parsing module 1534 is not able to determine a timestamp from the event data, the parsing module 1534 may use the time at which it is indexing the event data. As another example, the parsing module 1534 can use a user-configured rule to determine the timestamps to associate with events.

The parsing module 1534 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1534 may be able to determine event boundaries from the source type associated with the event data, for example from a data structure indicated by the source type. In some implementations, a user can configure rules the parsing module 1534 can use to identify event boundaries.

The parsing module 1534 can further extract data from events and possibly also perform transformations on the events. For example, the parsing module 1534 can extract a set of fields (key-value pairs) for each event, such as a host or hostname, source or source name, and/or source type. The parsing module 1534 may extract certain fields by default or based on a user configuration. Alternatively or additionally, the parsing module 1534 may add fields to events, such as a source type or a user-configured field. As another example of a transformation, the parsing module 1534 can anonymize fields in events to mask sensitive information, such as social security numbers or account numbers. Anonymizing fields can include changing or replacing values of specific fields. The parsing component 1534 can further perform user-configured transformations.

The parsing module 1534 outputs the results of processing incoming event data to the indexing module 1536, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1532 can be configured to identify searchable segments that are parts of fields, searchable segments that are entire fields, or both. The parsing module 1534 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1546, to find event data that matches a search query. In some implementations, segmentation can alternatively be performed by the forwarder 1526. Segmentation can also be disabled, in which case the indexer 1532 will not build a lexicon for the event data. When segmentation is disabled, the search system searches the event data directly.

Building index data structures generates the index 1538. The index 1538 is a storage data structure on a storage device (e.g., a disk drive or other physical device for storing digital data). The storage device may be a component of the computing device on which the indexer 1532 is operating (referred to herein as local storage) or may be a component of a different computing device (referred to herein as remote storage) that the indexer 1538 has access to over a network. The indexer 1532 can manage more than one index and can manage indexes of different types. For example, the indexer 1532 can manage event indexes, which impose minimal structure on stored data and can accommodate any type of data. As another example, the indexer 1532 can manage metrics indexes, which use a highly structured format to handle the higher volume and lower latency demands associated with metrics data.

The indexing module 1536 organizes files in the index 1538 in directories referred to as buckets. The files in a bucket 1544 can include raw data files, index files, and possibly also other metadata files. As used herein, "raw data" means data as when the data was produced by the data source 1502, without alteration to the format or content. As noted previously, the parsing component 1534 may add fields to event data and/or perform transformations on fields in the event data. Event data that has been altered in this way is referred to herein as enriched data. A raw data file 1548 can include enriched data, in addition to or instead of raw data. The raw data file 1548 may be compressed to reduce disk usage. An index file 1546, which may also be referred to herein as a "time-series index" or tsidx file, contains metadata that the indexer 1532 can use to search a corresponding raw data file 1548. As noted above, the metadata in the index file 1546 includes a lexicon of the event data, which associates each unique keyword in the event data with a reference to the location of event data within the raw data file 1548. The keyword data in the index file 1546 may also be referred to as an inverted index. In various implementations, the data intake and query system can use index files for other purposes, such as to store data summarizations that can be used to accelerate searches.

A bucket 1544 includes event data for a particular range of time. The indexing module 1536 arranges buckets in the index 1538 according to the age of the buckets, such that buckets for more recent ranges of time are stored in short-term storage 1540 and buckets for less recent ranges of time are stored in long-term storage 1542. Short-term storage 1540 may be faster to access while long-term storage 1542 may be slower to access. Buckets may be moves from short-term storage 1540 to long-term storage 1542 according to a configurable data retention policy, which can indicate at what point in time a bucket is old enough to be moved.

A bucket's location in short-term storage 1540 or long-term storage 1542 can also be indicated by the bucket's status. As an example, a bucket's status can be "hot," "warm," "cold," "frozen," or "thawed." In this example, hot bucket is one to which the indexer 1532 is writing data and the bucket becomes a warm bucket when the index 1532 stops writing data to it. In this example, both hot and warm buckets reside in short-term storage 1540. Continuing this example, when a warm bucket is moved to long-term storage 1542, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1520 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1520 through the monitoring console 1516 provided by the user interface system 1514. Using the monitoring console 1516, the user can configure and monitor an index cluster, and see information such as disk usage by an index, volume usage by an indexer, index and volume size over time, data age, statistics for bucket types, and bucket settings, among other information.

Figure 16:
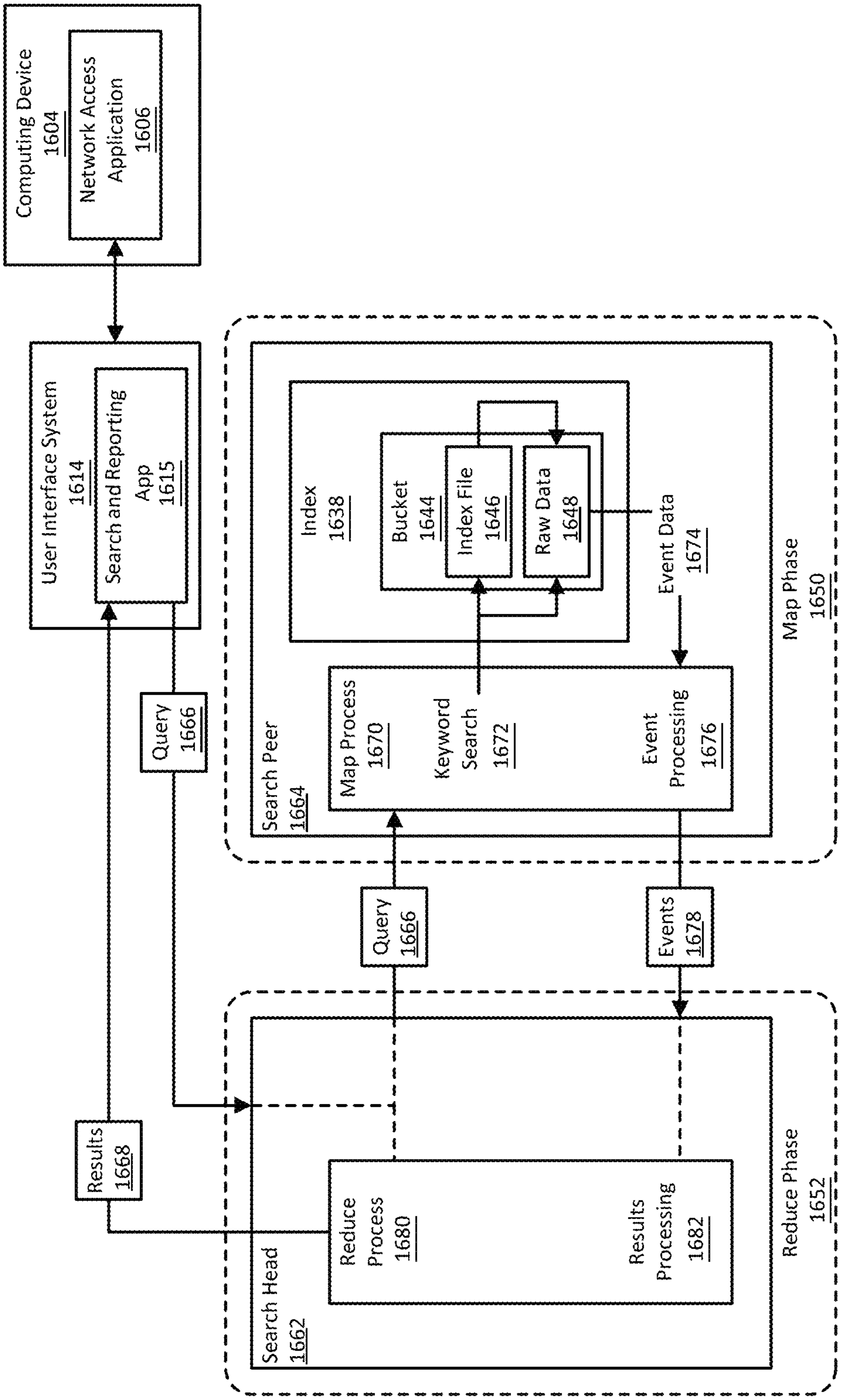
FIG. 16 is a block diagram illustrating in greater detail an example of the search system of a data intake and query system, such as the data intake and query system of FIG. 14 according to an implementation of the disclosure.

FIG. 16 is a block diagram illustrating in greater detail an example of the search system 1660 of a data intake and query system, such as the data intake and query system 1410 of FIG. 14. The search system 1660 of FIG. 16 issues a query 1666 to a search head 1662, which sends the query 1666 to a search peer 1664. Using a map process 1670, the search peer 1664 searches the appropriate index 1638 for events identified by the query 1666 and sends events 1678 so identified back to the search head 1662. Using a reduce process 1682, the search head 1662 processes the events 1678 and produces results 1668 to respond to the query 1666. The results 1668 can provide useful insights about the data stored in the index 1638. These insights can aid in the administration of information technology systems, in security analysis of information technology systems, and/or in analysis of the development environment provided by information technology systems.

The query 1666 that initiates a search is produced by a search and reporting app 1616 that is available through the user interface system 1614 of the data intake and query system. Using a network access application 1606 executing on a computing device 1604, a user can input the query 1666 into a search field provided by the search and reporting app 1616. Alternatively or additionally, the search and reporting app 1616 can include pre-configured queries or stored queries that can be activated by the user. In some cases, the search and reporting app 1616 initiates the query 1666 when the user enters the query 1666. In these cases, the query 1666 maybe referred to as an "ad-hoc" query. In some cases, the search and reporting app 1616 initiates the query 1666 based on a schedule. For example, the search and reporting app 1616 can be configured to execute the query 1666 once per hour, once per day, at a specific time, on a specific date, or at some other time that can be specified by a date, time, and/or frequency. These types of queries maybe referred to as scheduled queries.

The query 1666 is specified using a search processing language. The search processing language includes commands or search terms that the search peer 1664 will use to identify events to return in the search results 1668. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1666 to include sequential commands, where a subsequent command may operate on the results of a prior command. As an example, sequential commands may be separated in the query 1666 by a vertical line ("|" or "pipe") symbol.

In addition to one or more search commands, the query 1666 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1666 occurs in two broad phases: a map phase 1650 and a reduce phase 1652. The map phase 1650 takes place across one or more search peers. In the map phase 1650, the search peers locate event data that matches the search terms in the search query 1666 and sorts the event data into field-value pairs. When the map phase 1650 is complete, the search peers send events that they have found to one or more search heads for the reduce phase 1652. During the reduce phase 1652, the search heads process the events through commands in the search query 1666 and aggregate the events to produce the final search results 1668.

A search head, such as the search head 1662 illustrated in FIG. 16, is a component of the search system 1660 that manages searches. The search head 1662, which may also be referred to herein as a search management component, can be implemented using program code that can be executed on a computing device. The program code for the search head 1662 can be stored on a non-transitory computer-readable medium and from this medium can be loaded or copied to the memory of a computing device. One or more hardware processors of the computing device can read the program code from the memory and execute the program code in order to implement the operations of the search head 1662.

Upon receiving the search query 1666, the search head 1662 directs the query 1666 to one or more search peers, such as the search peer 1664 illustrated in FIG. 16. "Search peer" is an alternate name for "indexer" and a search peer may be largely similar to the indexer described previously. The search peer 1664 may be referred to as a "peer node" when the search peer 1664 is part of an indexer cluster. The search peer 1664, which may also be referred to as a search execution component, can be implemented using program code that can be executed on a computing device. In some implementations, one set of program code implements both the search head 1662 and the search peer 1664 such that the search head 1662 and the search peer 1664 form one component. In some implementations, the search head 1662 is an independent piece of code that performs searching and no indexing functionality. In these implementations, the search head 1662 may be referred to as a dedicated search head.

The search head 1662 may consider multiple criteria when determining whether to send the query 1666 to the particular search peer 1664. For example, the search system 1660 may be configured to include multiple search peers that each have duplicative copies of at least some of the event data and are implanted using different hardware resources q. In this example, the sending the search query 1666 to more than one search peer allows the search system 1660 to distribute the search workload across different hardware resources. As another example, search system 1660 may include different search peers for different purposes (e.g., one has an index storing a first type of data or from a first data source while a second has an index storing a second type of data or from a second data source). In this example, the search query 1666 may specify which indexes to search, and the search head 1662 will send the query 1666 to the search peers that have those indexes.

To identify events 1678 to send back to the search head 1662, the search peer 1664 performs a map process 1670 to obtain event data 1674 from the index 1638 that is maintained by the search peer 1664. During a first phase of the map process 1670, the search peer 1664 identifies buckets that have events that are described by the time indicator in the search query 1666. As noted above, a bucket contains events whose timestamps fall within a particular range of time. For each bucket 1644 whose events can be described by the time indicator, during a second phase of the map process 1670, the search peer 1664 performs a keyword search 1674 using search terms specified in the search query 1666. The search terms can be one or more of keywords, phrases, fields, Boolean expressions, and/or comparison expressions that in combination describe events being searched for. When segmentation is enabled at index time, the search peer 1664 performs the keyword search 1672 on the bucket's index file 1646. As noted previously, the index file 1646 includes a lexicon of the searchable terms in the events stored in the bucket's raw data 1648 file. The keyword search 1672 searches the lexicon for searchable terms that correspond to one or more of the search terms in the query 1666. As also noted above, the lexicon incudes, for each searchable term, a reference to each location in the raw data 1648 file where the searchable term can be found. Thus, when the keyword search identifies a searchable term in the index file 1646 that matches a search term in the query 1666, the search peer 1664 can use the location references to extract from the raw data 1648 file the event data 1674 for each event that include the searchable term.

In cases where segmentation was disabled at index time, the search peer 1664 performs the keyword search 1672 directly on the raw data 1648 file. To search the raw data 1648, the search peer 1664 may identify searchable segments in events in a similar manner as when the data was indexed. Thus, depending on how the search peer 1664 is configured, the search peer 1664 may look at event fields and/or parts of event fields to determine whether an event matches the query 1666. Any matching events can be added to the event data 1674 read from the raw data 1648 file. The search peer 1664 can further be configured to enable segmentation at search time, so that searching of the index 1638 causes the search peer 1664 to build a lexicon in the index file 1646.

The event data 1674 obtained from the raw data 1648 file includes the full text of each event found by the keyword search 1672. During a third phase of the map process 1670, the search peer 1664 performs event processing 1676 on the event data 1674, with the steps performed being determined by the configuration of the search peer 1664 and/or commands in the search query 1666. For example, the search peer 1664 can be configured to perform field discovery and field extraction. Field discovery is a process by which the search peer 1664 identifies and extracts key-value pairs from the events in the event data 1674. The search peer 1664 can, for example, be configured to automatically extract the first 100 fields (or another number of fields) in the event data 1674 that can be identified as key-value pairs. As another example, the search peer 1664 can extract any fields explicitly mentioned in the search query 1666. The search peer 1664 can, alternatively or additionally, be configured with particular field extractions to perform.

Other examples of steps that can be performed during event processing 1676 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1664 sends processed events 1678 to the search head 1662, which performs a reduce process 1680. The reduce process 1680 potentially receives events from multiple search peers and performs various results processing 1682 steps on the received events. The results processing 1682 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1682 can further include applying commands from the search query 1666 to the events. The query 1666 can include, for example, commands for evaluating and/or manipulating fields (e.g., to generate new fields from existing fields or parse fields that have more than one value). As another example, the query 1666 can include commands for calculating statistics over the events, such as counts of the occurrences of fields, or sums, averages, ranges, and so on, of field values. As another example, the query 1666 can include commands for generating statistical values for purposes of generating charts of graphs of the events.

The reduce process 1680 outputs the events found by the search query 1666, as well as information about the events. The search head 1662 transmits the events and the information about the events as search results 1668, which are received by the search and reporting app 1616. The search and reporting app 1616 can generate visual interfaces for viewing the search results 1668. The search and reporting app 1616 can, for example, output visual interfaces for the network access application 1606 running on a computing device 1604 to generate.

The visual interfaces can include various visualizations of the search results 1668, such as tables, line or area charts, Choropleth maps, or single values. The search and reporting app 1616 can organize the visualizations into a dashboard, where the dashboard includes a panel for each visualization. A dashboard can thus include, for example, a panel listing the raw event data for the events in the search results 1668, a panel listing fields extracted at index time and/or found through field discovery along with statistics for those fields, and/or a timeline chart indicating how many events occurred at specific points in time (as indicated by the timestamps associated with each event). In various implementations, the search and reporting app 1616 can provide one or more default dashboards. Alternatively or additionally, the search and reporting app 1616 can include functionality that enables a user to configure custom dashboards.

The search and reporting app 1616 can also enable further investigation into the events in the search results 1616. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1666. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 17:
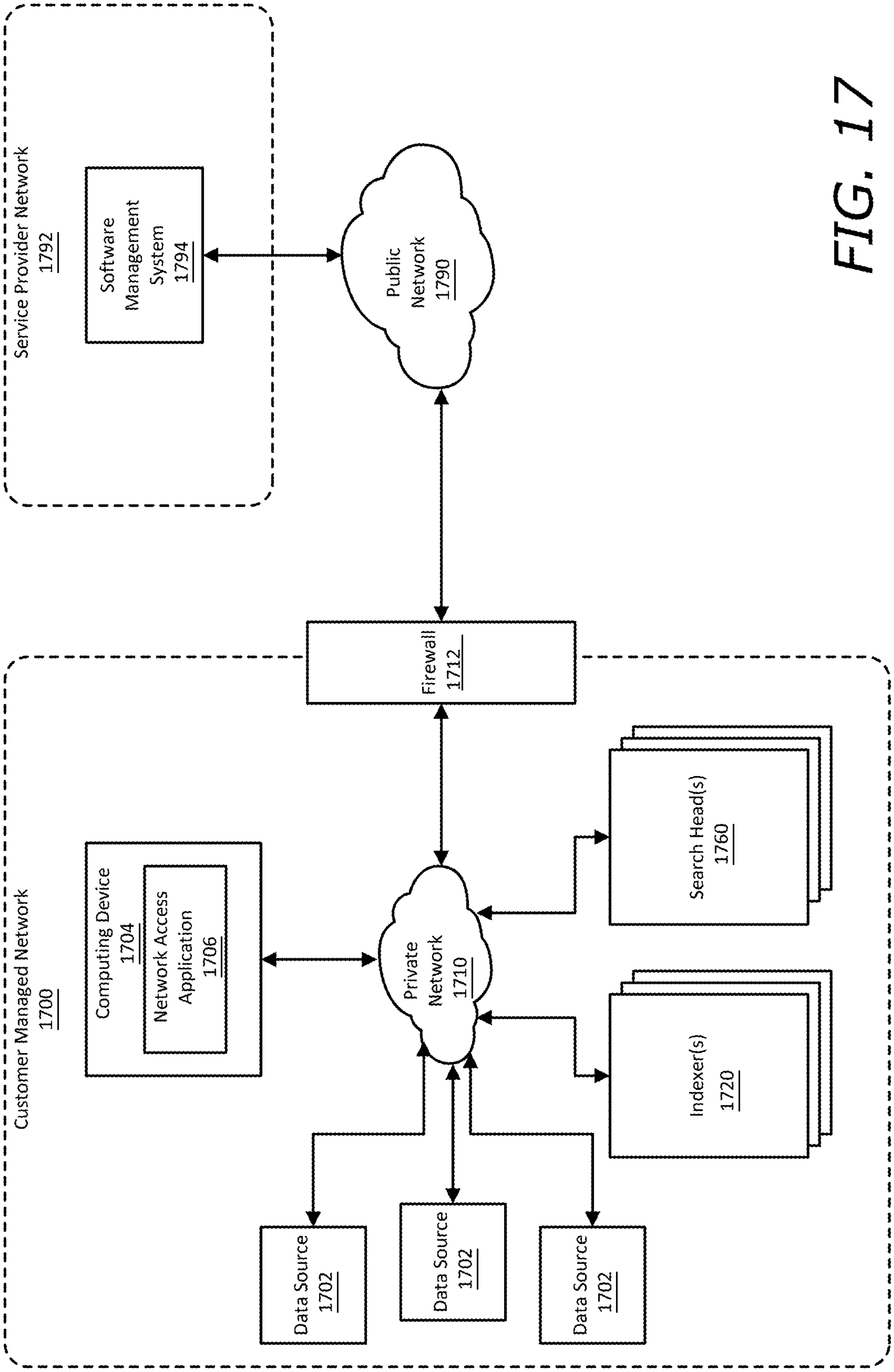
FIG. 17 illustrates an example of a self-managed network 1700 that includes a data intake and query system according to an implementation of the disclosure.

FIG. 17 illustrates an example of a self-managed network 1700 that includes a data intake and query system. "Self-managed" in this instance means that the entity that is operating the self-managed network 1700 configures, administers, maintains, and/or operates the data intake and query system using its own compute resources and people. Further, the self-managed network 1700 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1700 is located within the customer's on-prem environment, such as in the entity's data center, the operation and management of the self-managed network 1700, including of the resources in the self-managed network 1700, is under the control of the entity. For example, administrative personnel of the entity have complete access to and control over the configuration, management, and security of the self-managed network 1700 and its resources.

The self-managed network 1700 can execute one or more instances of the data intake and query system. An instance of the data intake and query system may be executed by one or more computing devices that are part of the self-managed network 1700. A data intake and query system instance can comprise an indexing system and a search system, where the indexing system includes one or more indexers 1720 and the search system includes one or more search heads 1760.

As depicted in FIG. 17, the self-managed network 1700 can include one or more data sources 1702. Data received from these data sources may be processed by an instance of the data intake and query system within self-managed network 1700. The data sources 1702 and the data intake and query system instance can be communicatively coupled to each other via a private network 1710.

Users associated with the entity can interact with and avail themselves of the functions performed by a data intake and query system instance using computing devices. As depicted in FIG. 17, a computing device 1704 can execute a network access application 1706 (e.g., a web browser), that can communicate with the data intake and query system instance and with data sources 1702 via the private network 1710. Using the computing device 1704, a user can perform various operations with respect to the data intake and query system, such as management and administration of the data intake and query system, generation of knowledge objects, and other functions. Results generated from processing performed by the data intake and query system instance may be communicated to the computing device 1704 and output to the user via an output system (e.g., a screen) of the computing device 1704.

The self-managed network 1700 can also be connected to other networks that are outside the entity's on-premise environment/network, such as networks outside the entity's data center. Connectivity to these other external networks is controlled and regulated through one or more layers of security provided by the self-managed network 1700. One or more of these security layers can be implemented using firewalls 1712. The firewalls 1712 form a layer of security around the self-managed network 1700 and regulate the transmission of traffic from the self-managed network 1700 to the other networks and from these other networks to the self-managed network 1700.

Networks external to the self-managed network can include various types of networks including public networks 1790, other private networks, and/or cloud networks provided by one or more cloud service providers. An example of a public network 1790 is the Internet. In the example depicted in FIG. 17, the self-managed network 1700 is connected to a service provider network 1792 provided by a cloud service provider via the public network 1790.

In some implementations, resources provided by a cloud service provider may be used to facilitate the configuration and management of resources within the self-managed network 1700. For example, configuration and management of a data intake and query system instance in the self-managed network 1700 may be facilitated by a software management system 1794 operating in the service provider network 1792. There are various ways in which the software management system 1794 can facilitate the configuration and management of a data intake and query system instance within the self-managed network 1700. As one example, the software management system 1794 may facilitate the download of software including software updates for the data intake and query system. In this example, the software management system 1794 may store information indicative of the versions of the various data intake and query system instances present in the self-managed network 1700. When a software patch or upgrade is available for an instance, the software management system 1794 may inform the self-managed network 1700 of the patch or upgrade. This can be done via messages communicated from the software management system 1794 to the self-managed network 1700.

The software management system 1794 may also provide simplified ways for the patches and/or upgrades to be downloaded and applied to the self-managed network 1700. For example, a message communicated from the software management system 1794 to the self-managed network 1700 regarding a software upgrade may include a Uniform Resource Identifier (URI) that can be used by a system administrator of the self-managed network 1700 to download the upgrade to the self-managed network 1700. In this manner, management resources provided by a cloud service provider using the service provider network 1792 and which are located outside the self-managed network 1700 can be used to facilitate the configuration and management of one or more resources within the entity's on-prem environment. In some implementations, the download of the upgrades and patches may be automated, whereby the software management system 1794 is authorized to, upon determining that a patch is applicable to a data intake and query system instance inside the self-managed network 1700, automatically communicate the upgrade or patch to self-managed network 1700 and cause it to be installed within self-managed network 1700.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:

generating a first graphical user interface (GUI) that displays a listing of a historical set of anomalies detected within a prior time window by an anomaly detection system;

receiving user feedback indicating that a first historical anomaly of the historical set of anomalies is false positive;

obtaining a current set of anomalies and the first historical anomaly marked as false positive, wherein each anomaly of the current set of anomalies includes one or more anomaly attributes;

constructing a prompt that includes instructions for a large language model (LLM) to provide a conclusion as to whether each anomaly of the current set of anomalies is to be categorized as false positive in view of the first historical anomaly that was marked as false positive, the prompt including the one or more anomaly attributes;

transmitting the prompt to the LLM via a first application programming interface (API);

receiving a response from the LLM, wherein the response includes the conclusion as to whether each anomaly of the current set of anomalies is to be categorized as false positive and a summary of the one or more anomaly attributes considered by the LLM in providing the conclusion; and generating a second GUI that displays the conclusion for each anomaly of the current set of anomalies and the summary of the one or more anomaly attributes considered by the LLM in providing the conclusion.

2. The computer-implemented method of claim 1, further comprising:

validating the conclusion as to whether each of the current set of anomalies is to be categorized as false positive based on similarity measures generated between vector representations of each of the current set of corresponding anomalies and stored vector representations of anomalies previously marked as false positives.

3. The computer-implemented method of claim 1, wherein the second GUI includes:

a listing of the current set of anomalies comprising an output of an anomaly detection system, the conclusion as to whether each of the anomalies is to be categorized as false positive, and an anomaly previously detected by the anomaly detection system that was marked as false positive through receipt of user feedback.

4. The computer-implemented method of claim 1, further comprising:

prior to providing the prompt to the LLM, performing a fine-tuning procedure on the LLM including providing a set of labeled example anomalies, constructing a fine-tuning prompt that provides instructions on classifying one or more additional unlabeled example anomalies as false positive or not, and transmitting the fine-tuning prompt to the LLM thereby initiating fine-tuning.

5. The computer-implemented method of claim 1, wherein constructing the prompt includes including a plurality of examples of historical anomalies with at least a subset labeled as false positives.

6. The computer-implemented method of claim 1, further comprising:

performing a model quantization process on the LLM including converting one or more of a set of parameters forming the LLM from a first precision format to a second precision format, wherein the first precision format is a higher precision than the second precision format.

7. The computer-implemented method of claim 6, wherein the second precision format is 8-bit integer (INT8).

8. A computing device, comprising:

a processor; and a non-transitory computer-readable medium having stored thereon instructions that, when executed by the processor, cause the processor to perform operations including:

generating a first graphical user interface (GUI) that displays a listing of a historical set of anomalies detected within a prior time window by an anomaly detection system;

receiving user feedback indicating that a first historical anomaly of the historical set of anomalies is false positive;

obtaining a current set of anomalies and the first historical anomaly marked as false positive, wherein each anomaly of the current set of anomalies includes one or more anomaly attributes;

constructing a prompt that includes instructions for a large language model (LLM) to provide a conclusion as to whether each anomaly of the current set of anomalies is to be categorized as false positive in view of the first historical anomaly that was marked as false positive, the prompt including the one or more anomaly attributes;

transmitting the prompt to the LLM via a first application programming interface (API);

receiving a response from the LLM, wherein the response includes the conclusion as to whether each anomaly of the current set of anomalies is to be categorized as false positive and a summary of the one or more anomaly attributes considered by the LLM in providing the conclusion; and generating a second GUI that displays the conclusion for each anomaly of the current set of anomalies and the summary of the one or more anomaly attributes considered by the LLM in providing the conclusion.

9. The computing device of claim 8, wherein the operations further comprise:

validating the conclusion as to whether each of the current set of anomalies is to be categorized as false positive based on similarity measures generated between vector representations of each of the current set of anomalies and stored vector representations of anomalies previously marked as false positives.

10. The computing device of claim 8, wherein the second GUI includes:

a listing of the current set of anomalies comprising an output of an anomaly detection system, the conclusion as to whether each of the anomalies is to be categorized as false positive, and an anomaly previously detected by the anomaly detection system that was marked as false positive through receipt of user feedback.

11. The computing device of claim 8, wherein the operations further comprise:

prior to providing the prompt to the LLM, performing a fine-tuning procedure on the LLM including providing a set of labeled example anomalies, constructing a fine-tuning prompt that provides instructions on classifying one or more additional unlabeled example anomalies as false positive or not, and transmitting the fine-tuning prompt to the LLM thereby initiating fine-tuning.

12. The computing device of claim 8, wherein constructing the prompt includes including a plurality of examples of historical anomalies with at least a subset labeled as false positives.

13. The computing device of claim 8, wherein the operations further comprise:

performing a model quantization process on the LLM including converting one or more of a set of parameters forming the LLM from a first precision format to a second precision format, wherein the first precision format is a higher precision than the second precision format.

14. The computing device of claim 13, wherein the second precision format is 8-bit integer (INT8).

15. A non-transitory computer-readable medium having stored thereon instructions that, when executed by one or more processors, cause the one or more processor to perform operations including:

generating a first graphical user interface (GUI) that displays a listing of a historical set of anomalies detected within a prior time window by an anomaly detection system;

receiving user feedback indicating that a first historical anomaly of the historical set of anomalies is false positive;

obtaining a current set of anomalies and the first historical anomaly marked as false positive, wherein each anomaly of the current set of anomalies includes one or more anomaly attributes;

constructing a prompt that includes instructions for a large language model (LLM) to provide a conclusion as to whether each anomaly of the current set of anomalies is to be categorized as false positive in view of the first historical anomaly that was marked as false positive, the prompt including the one or more anomaly attributes;

transmitting the prompt to the LLM via a first application programming interface (API);

receiving a response from the LLM, wherein the response includes the conclusion as to whether each anomaly of the current set of anomalies is to be categorized as false positive and a summary of the one or more anomaly attributes considered by the LLM in providing the conclusion; and generating a second GUI that displays the conclusion for each anomaly of the current set of anomalies and the summary of the one or more anomaly attributes considered by the LLM in providing the conclusion.

16. The non-transitory computer-readable medium of claim 15, wherein the operations further comprise:

validating the conclusion as to whether each of the current set of anomalies is to be categorized as false positive based on similarity measures generated between vector representations of each the current set of anomalies and stored vector representations of anomalies previously marked as false positives.

17. The non-transitory computer-readable medium of claim 15, wherein the second GUI includes:

a listing of the current set of anomalies comprising an output of an anomaly detection system, the conclusion as to whether each of the anomalies is to be categorized as false positive, and an anomaly previously detected by the anomaly detection system that was marked as false positive through receipt of user feedback.

18. The non-transitory computer-readable medium of claim 15, wherein the operations further comprise:

prior to providing the prompt to the LLM, performing a fine-tuning procedure on the LLM including providing a set of labeled example anomalies, constructing a fine-tuning prompt that provides instructions on classifying one or more additional unlabeled example anomalies as false positive or not, and transmitting the fine-tuning prompt to the LLM thereby initiating fine-tuning.

19. The non-transitory computer-readable medium of claim 15, wherein constructing the prompt includes including a plurality of examples of historical anomalies with at least a subset labeled as false positives.

20. The non-transitory computer-readable medium of claim 15, wherein the operations further comprise:

performing a model quantization process on the LLM including converting one or more of a set of parameters forming the LLM from a first precision format to a second precision format, wherein the first precision format is a higher precision than the second precision format.

* * * * *